(12) United States Patent
Ellinas et al.

(10) Patent No.: US 6,331,905 B1
(45) Date of Patent: Dec. 18, 2001

(54) NETWORK SWITCH FAILURE RESTORATION

(75) Inventors: Georgios Ellinas, Astoria; Thomas E. Stern, Riverdale, both of NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 09/282,609

(22) Filed: Apr. 1, 1999

(51) Int. Cl.$^7$ .............................. H04B 10/00; H04B 10/08
(52) U.S. Cl. .............................. 359/110; 359/117; 359/119
(58) Field of Search .................................... 359/110, 117, 359/119; 370/219, 220

(56) References Cited

U.S. PATENT DOCUMENTS

| | | |
|---|---|---|
| 5,003,531 | 3/1991 | Farinholt et al. . |
| 5,081,452 | 1/1992 | Cozic . |
| 5,343,464 * | 8/1994 | Iino ........................................ 370/16 |
| 5,444,694 | 8/1995 | Millet et al. . |
| 5,469,428 * | 11/1995 | Tokura ................................. 370/161 |
| 5,870,212 * | 2/1999 | Nathan ................................. 359/119 |

OTHER PUBLICATIONS

H. Komine et al., "Distributed Restoration Algorithm for Multiple–Link and Node Failures of Transport Networks", Dec. 2–5, 1990 GLOBECOM '90: , IEEE, vol. 1, pp. 459–463.

G. May et al., "A Distributed Architecture for Survivable Sonet Transport Networks", Dec. 2–5., 1991 GLOBECOM '91, IEEE, vol. 3, pp. 2013–2017.

A.F. Elrefaie, "Multiwavelength Survivable Ring Network Architectures", May 23–26, 1993, Proceedings of ICC '93, IEEE, vol. 2, pp. 1245–1251.

D. Johnson et al., "Distributed Restoration Strategies in Telecommunications Networks", May 1–5, 1994, Proceedings of ICC/SUPERCOMM '94, IEEE, vol. 1, pp. 483–488.

R.S.K. Chng et al., "Multi–Layer Restoration Strategy for Reconfigurable Networks", Nov. 28–Dec. 2, 1994, 1994 IEEE GLOBECOM, IEEE, vol. 3, pp. 1872–1878.

S.G. Finn et al., "Novel Approach to Automatic Protection Switching Using Trees", Jun. 8–12, 1997, Proceedings of ICC'97, IEEE, vol. 1, pp. 272–276.

C–S Li et al., "Automatic Fault Detection, Isolation, and Recovery in Transparent All–Optical Networks", Journal of Lightwave Technology, vol. 15, No. 10, pp. 1784–1793.

* cited by examiner

Primary Examiner—Leslie Pascal
Assistant Examiner—Agustin Bello
(74) Attorney, Agent, or Firm—Baker Botts LLP

(57) ABSTRACT

A system and method for automatically restoring a network which contains a node with a failed switch. Protection cycles are generated for the network to be restored and cyclegroups are generated from the protection cycles. Each node is provided with protection switches which internally interconnect the input/output ports to connecting links via interconnecting protection fibers. The selection of which internal protection fibers upon which to switch transmitted information onto allows the node to be configured to create merged cyclegroups. Thus if a failure in the central switch is detected, the transmitted information is diverted to a selected protection fiber corresponding to a merged cyclegroup so that the information can be automatically passed around the failed switch via the protection fibers. Each protection switch has associated mapping data which defines which protection fiber will be switched to based upon the input and output link for the transmission that is required to be sent through the node. The system and method applies to non-planar networks as well as planar networks.

29 Claims, 16 Drawing Sheets

FIG. 14

| PROTECTION PORT | NODE 2 | | NODE 4 | |
|---|---|---|---|---|
| | FROM | TO | FROM | TO |
| $p_1$ | 9 | 5 | 9 | 3 |
| $p_1$ | 8 | 6 | 5 | 2 |
| $p_1$ | 4 | 9 | 3 | 7 |
| $p_1$ | 7 | 3 | 8 | 10 |
| $p_1$ | 1 | 8 | 10 | 5 |
| $p_1$ | 3 | 7 | 7 | 6 |
| $p_1$ | 5 | 10 | 2 | 9 |
| $p_1$ | 10 | 4 | 6 | 1 |
| $p_1$ | 6 | 1 | 1 | 8 |
| $p_2$ | 5 | 5 | 3 | 3 |
| $p_2$ | 9 | 9 | 9 | 9 |
| $p_2$ | 4 | 4 | 2 | 2 |
| $p_2$ | 10 | 10 | 5 | 5 |
| $p_2$ | 6 | 6 | 10 | 10 |
| $p_2$ | 8 | 8 | 8 | 8 |
| $p_2$ | 1 | 1 | 1 | 1 |
| $p_2$ | 3 | 3 | 7 | 7 |
| $p_2$ | 7 | 7 | 6 | 6 |
| $p_3$ | 3 | 5 | * | * |
| $p_3$ | 10 | 7 | * | * |
| $p_3$ | 5 | 6 | * | * |
| $p_3$ | 1 | 10 | * | * |
| $p_3$ | 6 | 3 | * | * |
| $p_3$ | 7 | 1 | * | * |
| $p_4$ | 3 | 10 | * | * |
| $p_4$ | 5 | 7 | * | * |
| $p_4$ | 6 | 5 | * | * |
| $p_4$ | 10 | 1 | * | * |
| $p_4$ | 7 | 6 | * | * |
| $p_4$ | 1 | 3 | * | * |
| $p_4$ | 5 | 7 | * | * |
| $p_4$ | 3 | 10 | * | * |
| $p_4$ | 1 | 3 | * | * |
| $p_4$ | 7 | 5 | * | * |

| FROM–TO | 5 | 9 | 4 | 10 | 6 | 8 | 1 | 3 | 7 |
|---|---|---|---|---|---|---|---|---|---|
| 5–9 | $P_1$ | $P_1$ | $P_2$ | $P_2$ | * | * | * | * | * |
| 5–4 | $P_1$ | $P_2$ | $P_1$ | $P_2$ | * | * | * | * | * |
| 5–10 | $P_1$ | $P_2$ | $P_2$ | $P_1$ | * | * | * | * | * |
| 5–6 | $P_1$ | $P_2$ | $P_2$ | $P_3$ | $P_1$ | $P_2$ | $P_3$ | $P_3$ | $P_3$ |
| 5–8 | $P_1$ | $P_2$ | $P_2$ | $P_3$ | $P_2$ | $P_1$ | $P_3$ | $P_3$ | $P_3$ |
| 5–1 | $P_1$ | $P_2$ | $P_2$ | $P_4$ | $P_3$ | $P_2$ | $P_1$ | $P_3$ | $P_3$ |
| 5–3 | $P_1$ | $P_2$ | $P_2$ | $P_3$ | $P_3$ | $P_2$ | $P_3$ | $P_1$ | $P_3$ |
| 5–7 | $P_1$ | $P_2$ | $P_2$ | $P_4$ | $P_3$ | $P_2$ | $P_3$ | $P_3$ | $P_1$ |
| 9–4 | $P_2$ | $P_1$ | $P_1$ | $P_2$ | * | * | * | * | * |
| 9–10 | $P_2$ | $P_1$ | $P_2$ | $P_1$ | * | * | * | * | * |
| 9–6 | $P_2$ | $P_1$ | $P_2$ | $P_3$ | $P_1$ | $P_2$ | $P_3$ | $P_3$ | $P_3$ |
| 9–8 | $P_2$ | $P_1$ | $P_2$ | $P_3$ | $P_2$ | $P_1$ | $P_3$ | $P_3$ | $P_3$ |
| 9–1 | $P_2$ | $P_1$ | $P_2$ | $P_4$ | $P_3$ | $P_2$ | $P_1$ | $P_3$ | $P_3$ |
| 9–3 | $P_2$ | $P_1$ | $P_2$ | $P_3$ | $P_3$ | $P_2$ | $P_3$ | $P_1$ | $P_3$ |
| 9–7 | $P_2$ | $P_1$ | $P_2$ | $P_4$ | $P_3$ | $P_2$ | $P_3$ | $P_3$ | $P_1$ |
| 4–10 | $P_2$ | $P_2$ | $P_1$ | $P_1$ | * | * | * | * | * |
| 4–6 | $P_2$ | $P_2$ | $P_1$ | $P_3$ | $P_1$ | $P_2$ | $P_3$ | $P_3$ | $P_3$ |
| 4–8 | $P_2$ | $P_2$ | $P_1$ | $P_3$ | $P_2$ | $P_1$ | $P_3$ | $P_3$ | $P_3$ |
| 4–1 | $P_2$ | $P_2$ | $P_1$ | $P_4$ | $P_3$ | $P_2$ | $P_1$ | $P_3$ | $P_3$ |
| 4–3 | $P_2$ | $P_2$ | $P_1$ | $P_3$ | $P_3$ | $P_2$ | $P_3$ | $P_1$ | $P_3$ |
| 4–7 | $P_2$ | $P_2$ | $P_1$ | $P_4$ | $P_3$ | $P_2$ | $P_3$ | $P_3$ | $P_1$ |
| 10–6 | $P_4$ | $P_2$ | $P_2$ | $P_1$ | $P_1$ | $P_2$ | $P_3$ | $P_3$ | $P_3$ |
| 10–8 | $P_3$ | $P_2$ | $P_2$ | $P_1$ | $P_3$ | $P_1$ | $P_2$ | $P_3$ | $P_3$ |
| 10–1 | $P_3$ | $P_2$ | $P_2$ | $P_1$ | $P_3$ | $P_2$ | $P_1$ | $P_3$ | $P_3$ |
| 10–3 | $P_4$ | $P_2$ | $P_2$ | $P_1$ | $P_3$ | $P_2$ | $P_3$ | $P_1$ | $P_3$ |
| 10–7 | $P_3$ | $P_2$ | $P_2$ | $P_1$ | $P_3$ | $P_2$ | $P_3$ | $P_3$ | $P_1$ |
| 6–8 | * | * | * | * | $P_1$ | $P_1$ | $P_2$ | * | * |
| 6–1 | * | * | * | * | $P_1$ | $P_2$ | $P_1$ | * | * |
| 6–3 | $P_3$ | $P_2$ | $P_2$ | $P_3$ | $P_1$ | $P_2$ | $P_3$ | $P_1$ | $P_3$ |
| 6–7 | $P_3$ | $P_2$ | $P_2$ | $P_3$ | $P_1$ | $P_2$ | $P_4$ | $P_3$ | $P_1$ |
| 8–1 | * | * | * | * | $P_2$ | $P_1$ | $P_1$ | * | * |
| 8–3 | $P_3$ | $P_2$ | $P_2$ | $P_3$ | $P_2$ | $P_1$ | $P_3$ | $P_1$ | $P_3$ |
| 8–7 | $P_3$ | $P_2$ | $P_2$ | $P_3$ | $P_2$ | $P_1$ | $P_4$ | $P_3$ | $P_1$ |
| 1–3 | $P_3$ | $P_2$ | $P_2$ | $P_3$ | $P_4$ | $P_2$ | $P_1$ | $P_1$ | $P_3$ |
| 1–7 | $P_3$ | $P_2$ | $P_2$ | $P_3$ | $P_3$ | $P_2$ | $P_1$ | $P_3$ | $P_1$ |
| 3–7 | * | * | * | * | * | * | * | $P_1$ | $P_1$ |

| | 1 | 2 | 3 | 4 | 5 | 6 | 7 | 8 | 9 | 10 | 11 | 12 |
|---|---|---|---|---|---|---|---|---|---|---|---|---|
| 1-2 | p1 | p1 | p2 | | | | | | | | | |
| 1-3 | p1 | p2 | p1 | | | | | | | | | |
| 1-4 | p1 | p2 | p3 | p1 | p2 | p3 | p3 | p2 | p3 | p3 | p2 | p3 |
| 1-5 | p1 | p2 | p3 | | p1 | p3 | p3 | p2 | p3 | p3 | p2 | p3 |
| 1-6 | p1 | p2 | p4 | p4 | p2 | p1 | | | | | | |
| ⋮ | | | | | | | | | | | | |
| 3-7 | p3 | p2 | p1 | p3 | p2 | p4 | p1 | p2 | p4 | | | |
| ⋮ | | | | | | | | | | | | |
| 7-9 | | | | | | | p1 | p2 | p1 | | | |
| ⋮ | | | | | | | | | | | | |
| 12-4 | | | | p1 | p2 | p3 | p3 | p2 | p3 | p3 | p2 | p1 |
| ⋮ | | | | | | | | | | | | |

NETWORK SWITCH FAILURE RESTORATION

RELATED APPLICATION

This application is related to U.S. application Ser. No. 09/331,437 entitled "Automatic Protection Switching System in a Network" by Ellinas and Stem which claims priority to PCT application No. PCT/US 96/20598, which are both hereby incorporated by reference.

The United States Government has certain rights in this invention pursuant to award CDR-8421402 by the National Science Foundation.

FIELD OF INVENTION

The present invention relates to automatic protection switching systems and methods in networks for restoring switch failures.

BACKGROUND OF INVENTION

Today's communication systems for delivering data from a source to a destination are typically high-speed, high capacity systems that handle many different types of user services. One example of such a system is an optical fiber network used for telephone traffic or for other data exchange. These advanced networks can transport vast amounts of information at any given time. The networks are conventionally made of links connected to nodes which route information over the network to a desired destination.

In currently deployed telecommunication networks, failures occur often, and sometimes with serious consequences. An analysis of failures in the Public Switched Telephone Network (PSTN) has shown that human error, acts of nature, equipment failure and overloads are the major sources of failure. The impact of the failures can be measured in terms of how many times a particular failure occurred, duration of the outage, number of customers, and number of customer minutes (a customer minute is defined as the outage in minutes times the number of customers affected) affected during that outage. During the period of April 1992 through March 1994, the average number of customers affected due to cable cuttings or cable component failures was 216,690 costing 2,643 million customer minutes. Similarly, the average number of customers affected due to an equipment failure was 1,836,910, costing 3,544.3 million customer minutes. Cable cuttings and equipment failures account approximately for half of the failures encountered in the network during that period.

The recent interest in restoration techniques for fiber optic networks is largely because fiber optic transmission systems are cable-based technologies that are subject to frequent damage. Furthermore, due to the introduction of wavelength division multiplex (WDM) in commercial networks, each fiber can carry an extremely high volume of traffic and such failures can potentially affect a large number of customers, causing devastating effects to the network. Commercially available fiber optic transmission systems can currently use 2.5 Gb/sec/channel in each fiber and up to 64 channels per fiber. This translates to potentially 160 Gb/sec/fiber. Taking into account that on the average each cable carries 96 fibers, there is a possibility that a cable cut will result in the loss of about 15 Tb/sec. This in turn translates to the loss of 240 million voice circuits. These numbers can potentially grow much larger for future networks with $\leq 400$ fibers/cable with 80 (and possibly more) channels at OC-192 (10 Gb/sec) data rates. Thus, for a WDM transport infrastructure to become a reality, it is imperative that the reliability issue is studied and resolved in advance.

The most prevalent form of communication failures is the accidental disruption of buried telecommunication cables. Aerial cables are also affected but not at the same rate as the ones that are in the ground. Fiber cuts may result, among other reasons, from construction work, lightning, rodent damage, fires, train derailments, vandalism, car crashes and human error. One of the main reasons why telecommunication cables in the ground are so susceptible to failures is the fact that they are buried in the same public rights-of-way as are all other utility transport media (water, gas pipes, television cables, etc.). As a result, when craftspeople for one utility company try to work on their transport medium, they usually affect the rest of the buried transmission media as well.

Examples of fiber cuts that severely affected the network operation can be found throughout the short history of the fiber optic networks. During the 1980's in particular, when all the major telecommunications companies were laying most of their fibers in the ground, cable cuts were almost an everyday occurrence. One of the most devastating cable cuts occurred in 1987, when a 12-fiber lightwave cable which was a major backbone carrier facility (the term facility is defined as a fiber system that is used to transport optical signals) was severed. Because of that cut, an estimated 100,000 connections were almost immediately lost. Manual restoration of some of the capacity on physically diverse routes took several hours, and the failure cost the telephone company millions of dollars. A fault recovery system for link failures (as well as node failures in networks with planar topologies) is addressed in commonly assigned U.S. application Ser. No. 09/331437 identified above.

Equipment failures, even though not as common as cable cuts, can also devastate the network. The term equipment encompasses anything from transmitters, receivers, simple network switches, and all other peripheral equipment in a network node (such as protection switches, power devices, network management devices, etc.) up to a Central Office. In general, equipment failures affect many more customers than cable cuts, since all the connections passing through the failed network node are lost. Equipment failures can result from natural phenomena (earthquakes, floods, fires), human error, as well as hardware degradation. Examples of well-known equipment failures that had a devastating effect on the network include the 1988 fire that destroyed Illinois Bell's Hinsdale switching office, the 1987 fire that damaged N.Y. Telephone's Brunswick switching office and the 1987 AT&T switching computer failure in Dallas. The 1988 Illinois fire is rated as the worst telecommunications disaster in U.S. history since it happened in one of the busiest days of the year (Mother's day) and took more than a month to completely repair. All three failures cost the telephone companies millions of dollars in business lost by the customers during the outage and more importantly diminished the customer's confidence in the companies' services.

Management of these networks is an important but difficult problem. Even though failures cannot be avoided, quick detection, identification and restoration of a fault make the network more robust with highly reliable operations and ultimately increase the level of confidence in the services it provides. Failure restoration in particular is a crucial aspect for the successful deployment of today's telecommunication networks. A network fault that goes unattended for a long period of time can cause both tangible and intangible losses for the company that provides the service, as well as for its clients. A long outage may cause extensive revenue and asset losses, and seriously affect the services provided, and thus damage the credibility and reputation of an organization. A prolonged outage is considered so important that in 1992 it was specified that any outage resulting to the loss of telephone service to 50,000 or more customers for more than 30 minutes has to be reported to the FCC1. While prolonged outages can be particularly harmful, even brief ones can be troublesome. This is not only due to the economic impact of the outage time but also because of the vital services that are currently supported in the network. Whereas previously in telephone networks an outage meant that a telephone caller had to hand up and try again later, an outage nowadays may have a devastating impact. Thus, the current trend is for more and more networks that are virtually uninterruptible.

Fault restoration is defined as the process of re-establishing traffic continuity in the event of a failure condition affecting that traffic, by rerouting the signals on diverse facilities when a failure occurs. A network is defined as survivable if it is capable of failure restoration in the event of a failure condition. The degree of survivability is determined in part by the network's ability to survive network switch equipment failures. In order for a network to be survivable, it must topologically be able to allow rerouting around a fault condition.

It would be advantageous to provide a network fault recovery system and method which corrects for switch failures so that information originally routed through the failed switch would be properly transmitted from its source to its destination. It would be further advantageous to have the fault recovery system and method apply to any type of network topology (planar and non-planar topologies).

SUMMARY OF THE INVENTION

A system and method are provided which automatically restore a network including two or more nodes connected by links, where a fault occurs within the central switching mechanism of one of the nodes, by providing at least one protection switch for each of the nodes in the network wherein the protection switch is capable of switching information from a working (or normal operation) link to one of a plurality of protection fibers associated with the node. The protection fibers then route the information through one or more cyclegroups which allow the information to be transmitted to its destination. A memory for storing mapping data is also provided which contains data indicating for each protection switch the selection of the proper protection fiber which should be switched to in response to the identity of the input link for a given transmission and the output link for the transmission. If a failure does occur in the central switch, then the protection switches will reroute the transmission from the working fiber to the identified protection fiber. Also included in the system is a fault detector which detects if a problem occurs with the central switch.

The system and method apply to both planar and non-planar networks. For non-planar networks, protection cycles and cyclegroups are generated using a Orientable Cycle Double Cover technique which includes backtracking in determining the protection cycles. All of the mapping data for the look-up tables can be calculated prior to the network being operational and once the mapping data is stored, the protection switches in each node will respond automatically in a distributed manner in the event of a switch fault with no need for central routing control for the entire network. The protection fibers internal to the node are connected in such a way that information can be passed to other link ports in a bidirectional manner. The mapping data then identifies which of the protection fibers related to a cyclegroup will receive the transmission so that it can be passed ultimately to the output link.

BRIEF DESCRIPTION OF THE DRAWINGS

Further objects, features and advantages of the invention will become apparent from the following detailed description taken in conjunction with the accompanying figures showing illustrative embodiments of the invention, in which

FIG. 14 shows a table indicating how the protection switches in network nodes 2 and 4 are interconnected in the example of FIG. 13;

FIG. 15 shows an example of a look-up table for node 2 in the example of FIG. 13; and FIG. 16 shows an example of a node look up table for a four cyclegroup network.

DESCRIPTION OF A PREFERRED EMBODIMENT

Figure 1A:
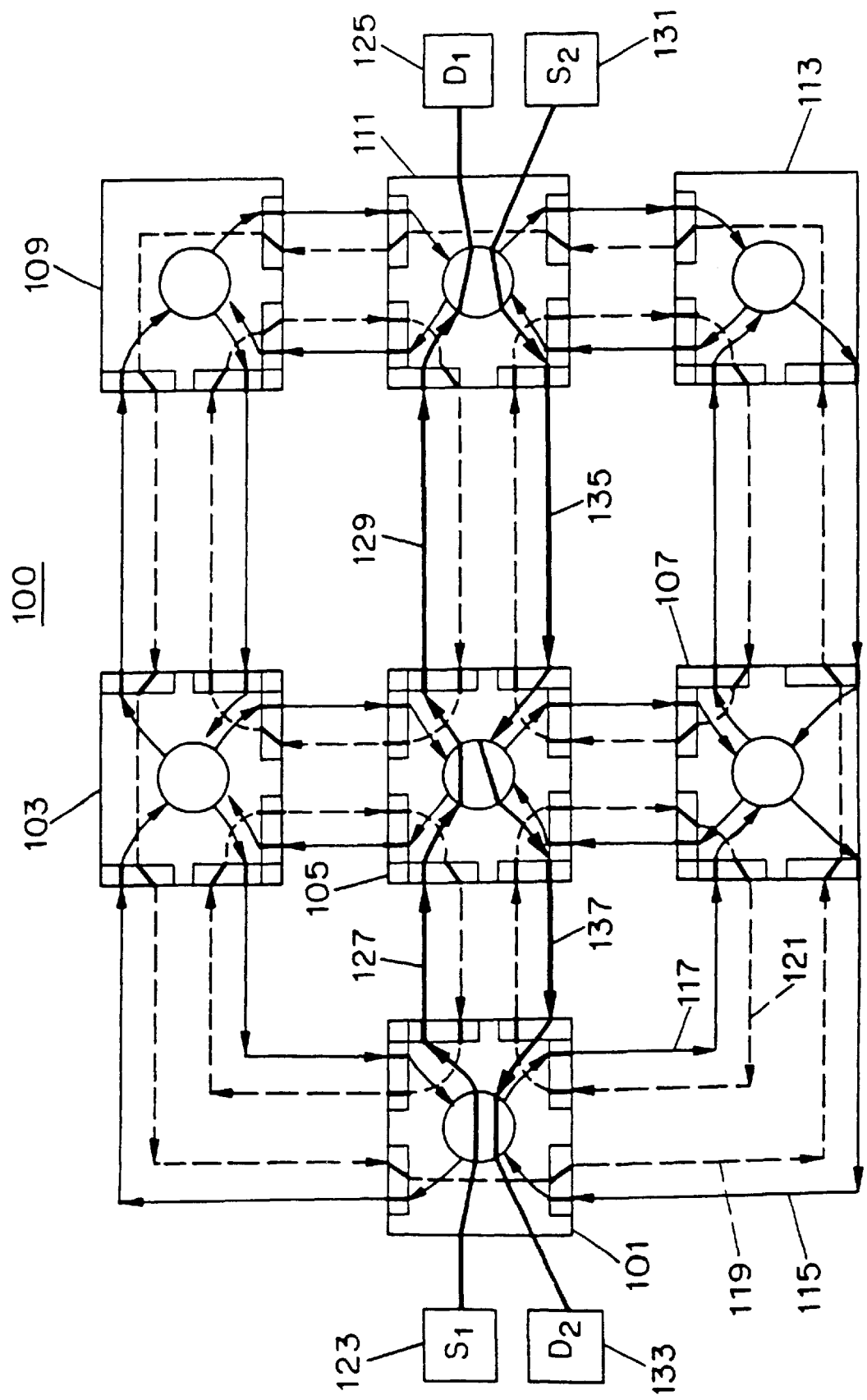
FIG. 1A shows a planar network with seven network nodes.

Automatic protection switching ("APS") for node failures requires rapid recovery from any failure of a network node. A network node is any station containing switching equipment (including protection switches) connected to one or more links and possibly end user equipment for the purpose of creating data paths between end users over successions of links and intermediate nodes. Links may be made up of one or more data conduits for transmitting data (including information in any form). In this preferred embodiment, optical fibers will be described as the conduits, so that a link will be composed of pairs of fibers carrying traffic in opposite directions. The central switches within nodes are preferably optical switches in this embodiment.

A network contains two or more nodes which are selectively connected together by links in a particular configuration. In this preferred embodiment, each link in a network contains a number of optical fibers, each of which carries data in a single direction along the length of the link. The fibers could alternatively be any conventional type of transmission line or data conduit. Each fiber is oriented to carry data in a single direction by terminating connections and/or other equipment in the network, e.g., optical fiber amplifiers. A node failure occurs when the switch fabric in the node is damaged or inhibited and data cannot pass through the node. In the APS of the present invention, node failures are circumvented by re-routing signals from working fibers, which normally carry the data, to selected protection fibers which are available to carry the data if needed using protection switches in nodes at the ends of each network link. The protection switches are activated immediately when a fault is detected in the network.

The present invention uses redundancy (protection fibers) to improve the reliability performance of the data transport network. The switch is monitored by a monitoring system within the node and if a failure is detected, the data is switched to selected protection fibers within the switch. Generally, the time it takes to detect a failure and switch to the protection fibers is on the order of milliseconds, e.g., 60 msec. The protection switching is performed at the individual switching nodes without an instruction from a central manager, and thus the APS process is distributed and autonomous.

The node failure described above means that the central switch in the node fails so that no information can be processed through the switch. The objective of the automatic protection system is to ensure that a valid data path which circumvents the failed node is setup in a fast and efficient manner. The data signals that would normally use the failed switch are re-routed on a path made up of protection fibers until they reach the other side of the node within the failed switch. There they switch back to the working fiber and continue towards their destination. The APS process of the present invention will restore the failed information flow by automatically rerouting the information around the failed switch.

The system and method of the present invention performs fault recovery in both planar and non-planar networks. A graph is planar by definition if its edges can be drawn on a plane so that no two edges intersect at any other point but a vertex. The technique which is used for non-planar networks also applies to planar networks. A description of a planar network with protection fibers external to the nodes is first described below to describe a network generally. FIG. 1A shows a planar network with seven network nodes and with bi-directional protection fibers accompanying each bi-directional working fiber. The network nodes 101, 103, 105, 107, 109, 111 and 113 are selectively connected by working fibers indicated by the solid outer arrows between the nodes. The arrows indicate the direction in which the data flows. In working fiber 115, data flows from network node 107 to network node 101 while in working fiber 117 data flows in the reverse direction, from network node 101 to network node 107. The protection fibers are shown by dotted arrows in the network. The arrows also indicate the direction of the data flow through the fiber. For example, protection fiber 119 would transfer data from network node 101 to network node 107 if required. Additionally, protection fiber 121 would transfer data from network node 107 to network node 101. As shown in network 100, each link between two network nodes contains two working fibers operating in opposite directions and two protection fibers operating in opposite directions. A link may contain additional pairs of working and protection fibers.

Also shown is system 100 is an end user source $S_1$ 123 and a corresponding end user destination $D_1$ 125. The data path between the source and destination in the network 100 is shown operating without any link or node failures by the bold line arrows 127 and 129. The data flows from source $S_1$ 123 in network node 101 to working fiber 127 to network node 105 to working fiber 129 to destination $D_1$ 125 in network node 111. Also shown in system 100 is a second transmission route from a source $S_2$ 131 to destination $D_2$ 133. The data transmission route goes from source $S_2$ 131 in network node 111 to working fiber 135 to node 105 to working fiber 137 to destination $D_2$ 133 in network node 101.

Figure 1B:
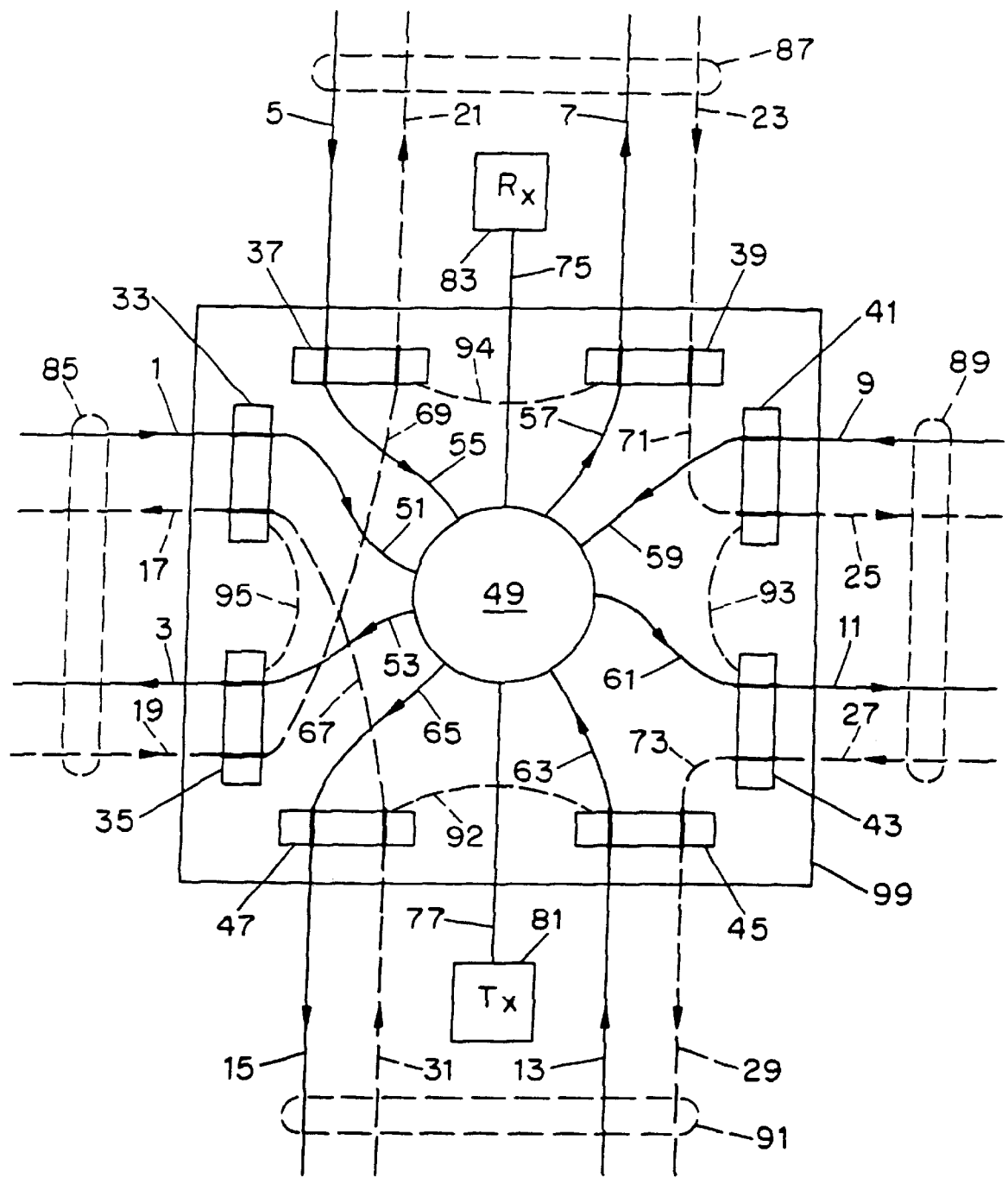
FIG. 1B shows a network node with four connected bidirectional links.

FIG. 1B shows an example of a network node 99 with protection fibers connected to other network nodes in a network through four links. Each link includes a pair of working fibers transmitting data in opposite directions. These working fibers are connected to other network nodes not shown in FIG. 1B and a pair of protection fibers, transmitting data in opposite directions. Referring to FIG. 1B, link 85 includes working fiber pair 1, 3 and protection fiber pair 17, 19. Link 87 includes working fiber pair 5, 7 and protection fiber pair 21, 23. Link 89 includes working fiber pair 9, 11 and protection fiber pair 25, 27. Link 91 includes working fiber pair 13, 15 and protection fiber pair 29, 31. These protection fibers are also connected to other network nodes not shown in FIG. 1B. Within each link each working and protection fiber pair transmitting data in opposite directions terminates at a protection switch. In FIG. 1B, working fiber 1 and protection fiber pair 17 in link 85 terminate at protection switch 33, working fiber 3 and protection fiber 19 in link 85 terminate at protection switch 35, working fiber 5 and protection fiber 21 terminate in link 87 at protection switch 37, working fiber 7 and protection fiber 23 in link 87 terminate at protection switch 39, working fiber 9 and protection fiber 25 in link 89 terminate at protection switch 41, working fiber 11 and protection fiber 27 in link 89 terminate at protection switch 43, working fiber 13 and protection fiber 29 in link 91 terminate at protection switch 45, and working fiber 15 and protection fiber 31 in link 91 terminate at protection switch 47. All these working and protection fiber pairs also terminate at protection switches at the other network nodes which are connected to network node 99 but not shown in FIG. 1B. In the preferred embodiment of an optical network, protection switches are opto-mechanical switches but could also be any type of conventional switching devices depending upon the type of network being protected. The state of the protection switches in the network under normal non-failure operation as shown by the protection switch position in FIG. 1B is termed the BAR state. When a failure is detected, some of the protection switches are reconfigured appropriately, as described below.

Network node 99 also contains a central switch 49 which routes information from its incoming to its outgoing ports. In the preferred embodiment of an optical network, central switch 49 can be implemented by an optical switch, an example of which is described by Iqbal et al. in "High Performance Optical Switches for Multiwavelength Rearrangeable Optical Networks", *Government Microelectronic Circuits Application Conference (GOMAC)* '94, San Diego, Calif., November 1994 (which is hereby incorporated by reference). They could also be any type of conventional switching devices depending upon the type of network being protected.

While the network is operating free of failures, working fibers are connected to central switch 49 through protection switches and working interconnection fibers. Working fiber 1 is connected to central switch 49 through protection switch 33 and working interconnection fiber 51. Working fiber 3 is connected to central switch 49 through protection switch 35 and interconnection fiber 53. Working fiber 5 is connected to central switch 49 through protection switch 37 and interconnection fiber 55. Working fiber 7 is connected to central switch 49 through protection switch 39 and interconnection fiber 57. Working fiber 9 is connected to central switch 49 through protection switch 41 and interconnection fiber 59. Working fiber 11 is connected to central switch 49 through protection switch 43 and interconnection fiber 61. Working fiber 13 is connected to central switch 49 through protection switch 45 and interconnection fiber 63. Working fiber 15 is connected to central switch 49 through protection switch 47 and interconnection fiber 65. Protection fibers are interconnected among themselves through protection switches and protection interconnection fibers. For example, protection fiber 17 is connected to protection fiber 31 through protection switch 33, protection interconnection fiber 67 and protection switch 47. Protection fiber 19 is connected to protection fiber 21 through protection switch 35, protection switch 37 and protection interconnection fiber 69. Protection fiber 23 is connected to protection fiber 25 through protection switch 39, protection switch 41 and protection interconnection fiber 71. Protection fiber 27 is connected to protection fiber 29 through protection switch 43, protection switch 45 and protection interconnection fiber 73. Protection interconnection fibers 92, 93, 94 and 95 respectively interconnect protection switches on a common side of the node. Transmitter 81 and receiver 83 are connected to central switch 49 through access fibers 77 and 75, respectively. Other end user equipment can also be connected if desired.

The protection fibers are organized into a number of protection cycles within the network. A protection cycle is a closed loop of unidirectional fibers. Each protection fiber is part of one and only one protection cycle in the automatic protection switching system. A protection cycle will not contain two protection fibers oriented in opposite directions in the same link unless the protection cycle includes a bridge. The protection cycles are made up of the protection fibers and protection interconnection fibers and are predetermined and set up prior to the activation of the network. No centralized decision process as to which protection fibers must be used in the network to redirect the data in case of a node failure is necessary. This allows for fast, immediate protection of a node failure.

A bridge occurs when a network node is connected to the rest of the network through a single link. Furthermore, a bridge occurs when a link is the only point of connection between otherwise disconnected parts of a network. If the bridge is severed, the network is cut into two disconnected parts, and there is no way to transmit data between those parts without restoring the link, because there is no alternate path available.

Figure 2A:
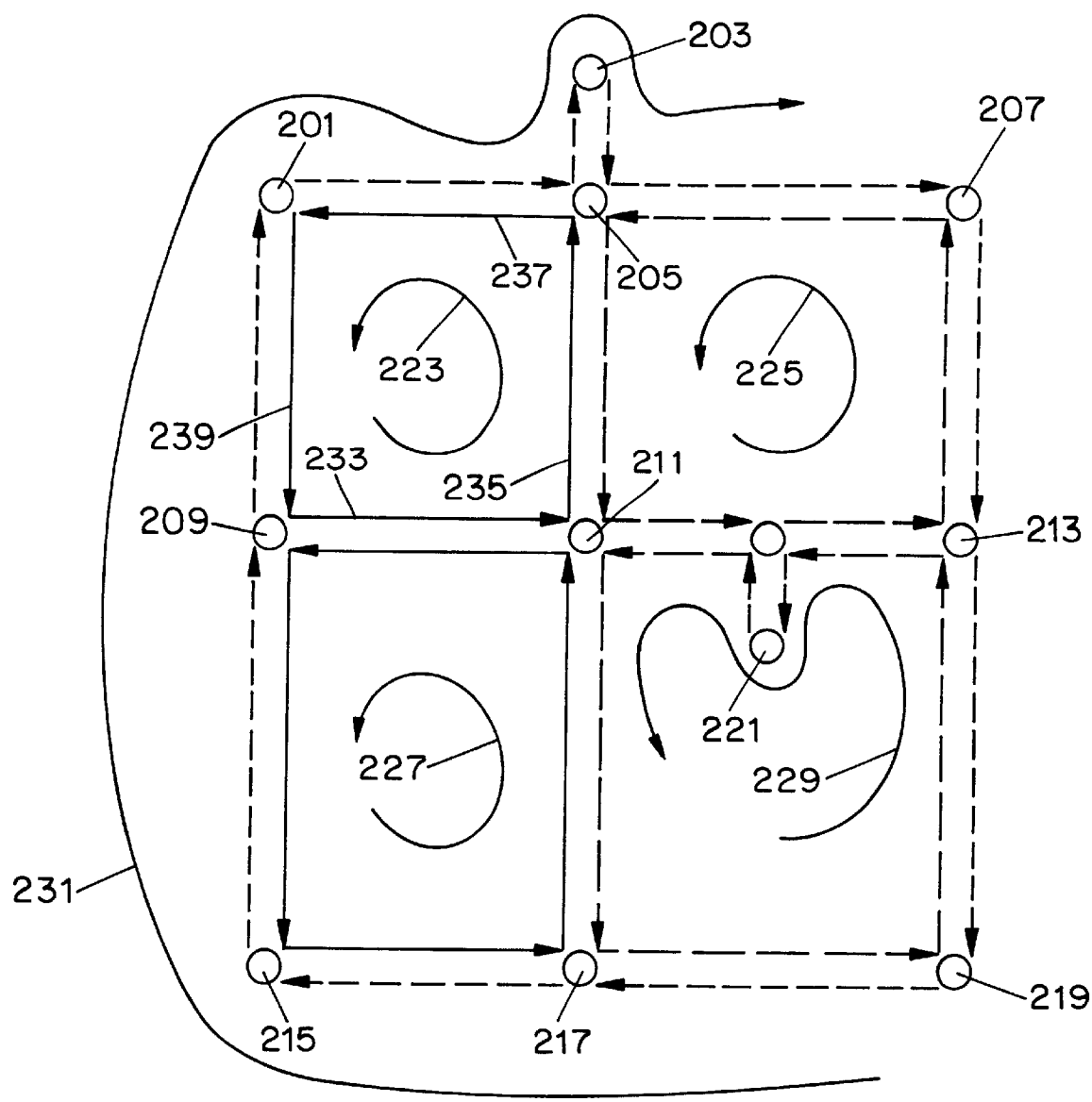
FIG. 2A shows a plane graph representation of a network with a planar topology.

The protection cycles, used to protect the network against a link and node failure, are predetermined by modeling the network as a directed graph with vertices representing the network nodes and directed edges representing the protection fibers in the network. One embodiment of the present invention has a network with a planar topology, hence its corresponding graph is also planar. A graph is planar by definition if its edges can be drawn on a plane so that no two edges intersect at any other point but a vertex. When so drawn, the graph is called a plane graph. FIG. 2A shows a plane graph representation of a network with planar topology with calculated directed cycles. The vertices representing network nodes 201, 203, 205, 207, 209, 211, 213, 215, 217, 219, and 221 are shown by the black dots in FIG. 2A. Directed cycles 223, 225, 227 and 229 are directionally oriented in the same manner, i.e., counterclockwise, in the inner faces of the plane graph. An inner face of a plane graph is the inside of three or more edges connected together to form a closed space. A directed cycle 231 oriented in the opposite direction, clockwise in this example, is placed around the outside of the planar graph (outer face).

After the appropriate directed cycles are computed in the directed graph representation of the network, the protection switches in the network are interconnected with protection interconnection fibers so that the resulting directed closed paths of protection fibers correspond to the direction cycles found in the corresponding directed graph for the planar case. For example, directed edges 233, 235, 237 and 239 in FIG. 2A form directed cycle 223. Directed edges 233, 235, 237 and 239 correspond to protection fibers in the corresponding network. The protection switch in network node 211 (modeled as vertex 211 in corresponding graph) that terminates protection fiber 233 is interconnected to the protection switch that terminates protection fiber 235 also in network node 211. This interconnection is made with a protection interconnection fiber. Similarly, the interconnections are made for the protection switches terminating protection fibers 235 and 237 in network node 205, the protection switches terminating protection fibers 237 and 239 in network node 201, and the protection switches terminating protection fibers 239 and 233 in network node 209, all of which create protection cycle 223.

This configuration of the automatic protection switching system for planar topologies achieves the condition of having two protection fibers oriented in opposite directions in different protection cycles for every link between two network nodes, unless there is a bridge as previously defined. It also achieves the condition that each protection fiber appears in one and only one protection cycle. Vertices 203 and 221 (representing network nodes) are attached to bridge links because they are connected to the rest of the graph (representing the network) only through one link. If the link that connects network node 203 to network node 205 in the corresponding network is severed, it would not be possible to transfer the necessary information in a protection cycle without repairing the faulty link. If a bridge link failure occurs in the network, there can be no suitable protection for that bridge link. The network node on the other side of the bridge can only receive data from the bridge link itself. Therefore, a network should be designed to minimize the number of bridge links in order to gain maximum operational protection through the use of the protection cycles. If the net topology is modified after initial network activities, through the addition or deletion of network nodes or links, the protection cycles can easily be re-computed to give complete protection to the entire network. The protection against a node failure in a planar topology is addressed in commonly assigned U.S. application Ser. No. 09/331,437 identified above.

The above discussion focuses on networks with planar topologies; however, the inventive technique is extended to networks with non-planar topologies as well. A non-planar bridgeless graph has an Orientable Cycle Double Cover, which means that each bi-directional edge in a network will appear in exactly two directed cycles, one in each direction. A graph corresponding to a network (of any topology) has bi-directional edges corresponding to the protection fibers in the network. Each bi-directional edge consists of a pair of directed edges in opposite direction. Thus the edges can be divided into directed cycles such that each directed edge appears in exactly one directed cycle and both directions of a single bi-directional edge does not appear in the same directed cycle. Therefore, protection cycles with the characteristics previously defined can always be found for networks with non-planar topologies.

The directed cycles can be determined in a non-planar graph by applying a conventional algorithm called backtracking (also called branch and bound algorithm) together with a technique described below in FIG. 10 that checks and ensures that the constraints imposed on the directed cycles discussed above are followed. Backtracking is well known in the art. (See e.g., *Combinatorial Algorithms*, by T. C. Hu, Chapter 4, pages 138–161, Addison Wesley Publishing Company, 1982; which is hereby incorporated by reference). While backtracking can be computationally complex, the protection cycles can be determined before the network is in actual use so that a large computation time is not a concern. Other conventional methods of determining the directed cycles may also be used.

A network configuration of network nodes and links can be tested to determine if a network has a planar topology or not, by using a planar testing algorithm well known in the art. (See e.g., *Algorithmic Graph Theory*, by Alan Gibbons, page 85–93, Cambridge University Press, 1985; which is hereby incorporated by reference). Once a determination is made of whether the network has a planar topology or not, the protection cycles for that particular type of network can be found and implemented in the network.

The automatic protection switching system of the present invention protects against switch failures in the network. In the preferred embodiment of an optical network, the central switch will be an optical switch. It could also be any type of conventional switching device depending upon the type of network being protected. In order to achieve central switch protection for non-planar networks, the protection switches in the network nodes as shown in FIG. 1B are modified.

The switch failure restoration method of the present invention applies to both planar and non-planar topologies. The methodology for non-planar restoration is also applicable to planar topology. In contrast to the planar case, where only one (priority) bi directional node-connection can be restored at a time, larger protection switches can be used for the non-planar method to enable the restoration of more than one bi-directional node-connections that pass through a failed network switch. The actual number of node-connections that can be restored simultaneously depends upon the input-link, output-link pair of the priority node-connection as well as the rest of the node-connections passing through the failed switch. Restoration of a network switch failure in networks with non-planar technologies includes the restoration of at least one priority bi-directional node connection passing through the failed network switch.

Figure 2B:
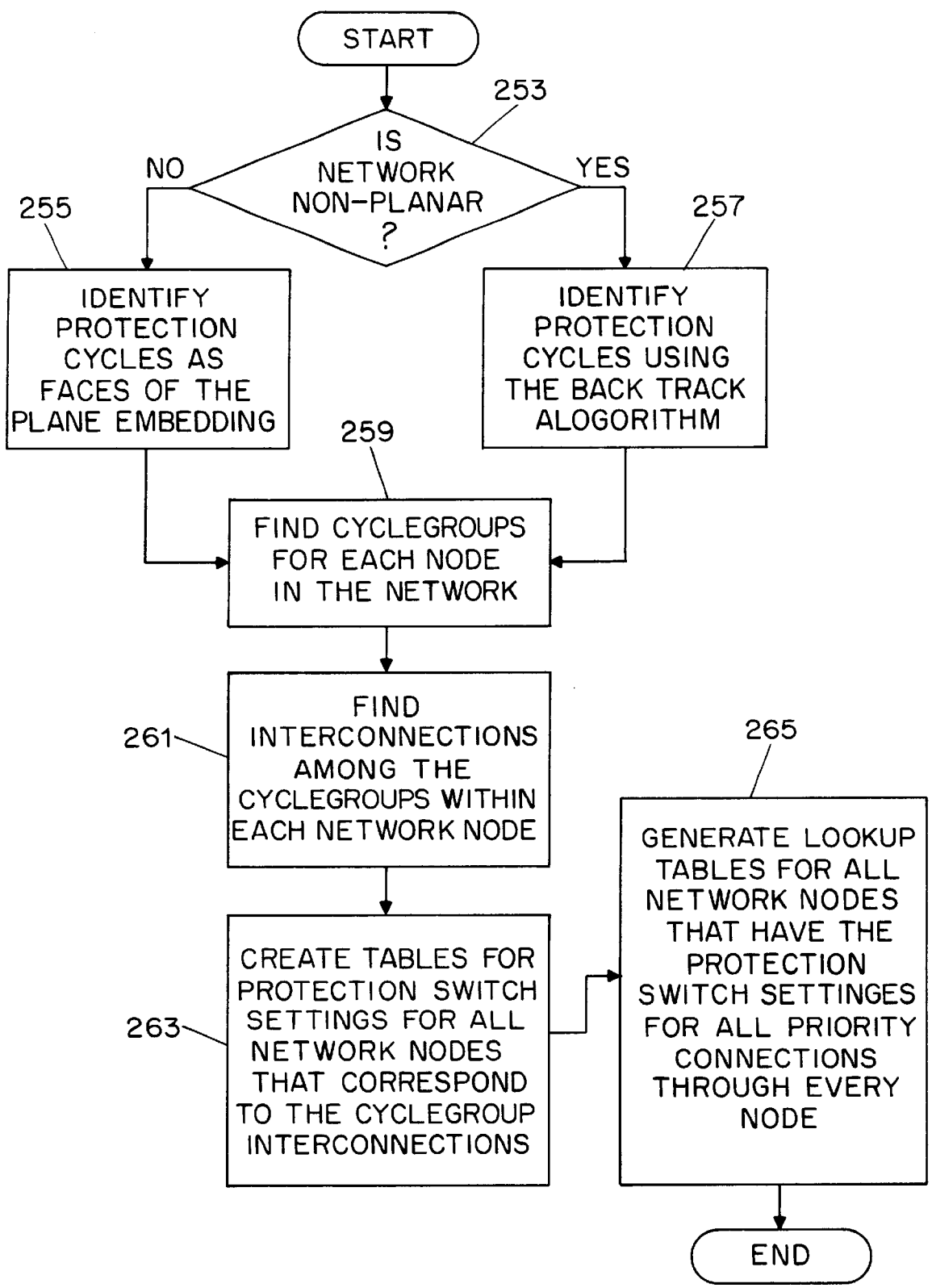
FIG. 2B shows a flowchart of the steps that generate look-up tables for each network node.

FIG. 2B is a flowchart of the steps of the switch failure recovery technique in accordance with the invention. Step 253 identifies the net topology as planar or non-planar using conventional techniques (e.g., the technique described above). Step 253 then determines if the network is non-planar. If it is non-planar, the process continues with step 257. If the network is planar, then the technique continues with step 255.

Step 255 (planar network) identifies protection cycles as faces in a plane with the network nodes embedded. This method is described in FIG. 2A and its corresponding text.

Step 257 (non-planar network) identifies protection cycles using the backtrack technique. This method is described in detail below in FIG. 10 and its corresponding text. Step 259 then finds the cyclegroups for each node in the network as also described in FIG. 10 and its corresponding text. Cyclegroups are explained in more detail below. Step 261 then determines the interconnections to establish each cyclegroup among the protection interconnection fibers within each network node. Cyclegroups are interconnected by the protection interconnection fibers connected to the protection switches. Step 263 then creates tables for protection switch settings (which interconnection protection fibers will be used) for all network nodes that correspond to the cyclegroup interconnections. This creates the merged cyclegroups through the interconnection protection fibers and the external cyclegroups. Step 265 then generates a look-up table for all network nodes that have the protection switch settings for all priority connections through every node. A priority connection is a connection from an input link to an output link which has the highest priority to be restored. Each protection switch will have multiple interconnecting protection fibers and one of the protection fibers will be selected for each protection switch depending upon the entry in the look-up table corresponding to the current priority connection to be restored.

Figure 3A:
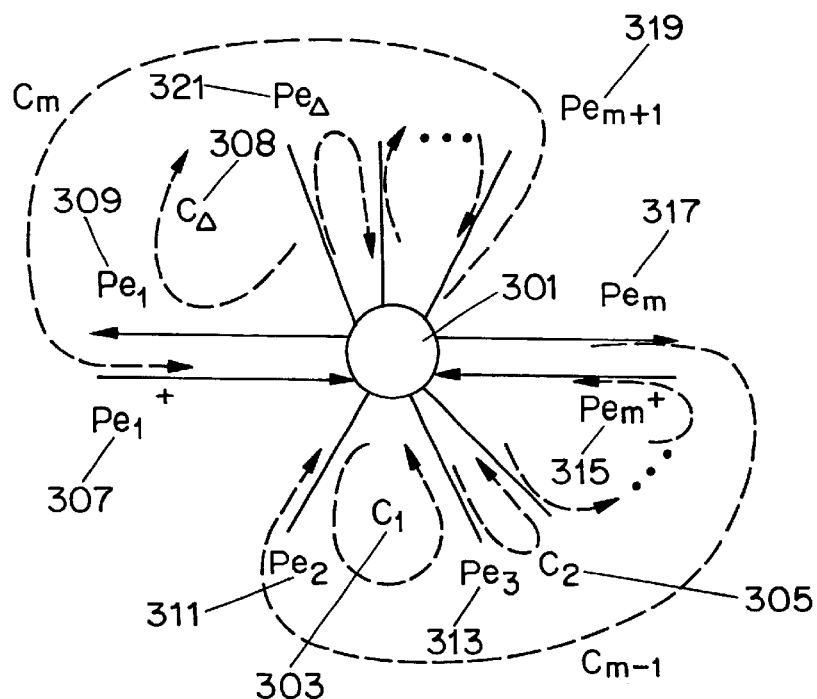
FIG. 3A shows an example of protection cycles for a network node.

Cyclegroups will now be explained in more detail. FIG. 3A shows an example of protection cycles for a network node with degree Δ. The degree means the number of links coming into the switching node. The node can be part of a planar or non-planar network. A network node 301 is shown with a number of protection cycles partially defined by links connected to the node. Protection cycle C1 303, C2 305 and additional protection cycles up to CΔ 308 are shown. Also shown are protection cycles $C_m$ and $C_{m-1}$. Each edge (or link pair) shown consists of a directed pair. $Pe^+$ shows information being transmitted into the node and $Pe^-$ shows information being transmitted out of the node. FIG. 3A shows different directed links $Pe_1^+$ 307 and $Pe_1^-$ 309, 313 $Pe_{m+}$ 315, $Pe_{m-}$ 317, and $Pe_{m+1}$, 319.

Figure 3B:
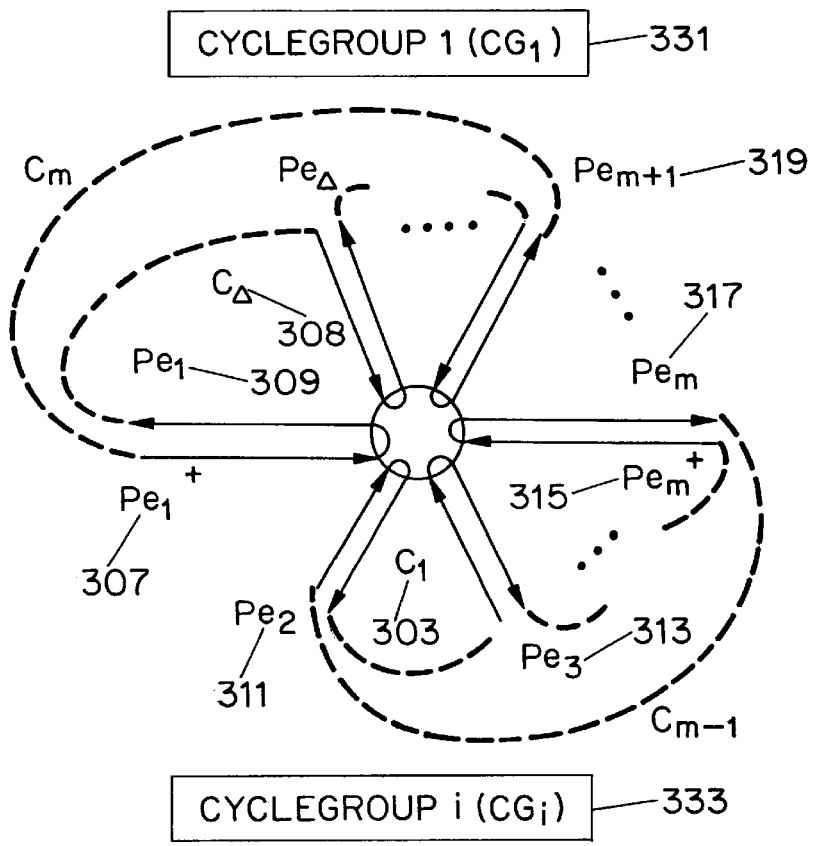
FIG. 3B shows an example of a cyclegroup.

FIG. 3B shows an example of cyclegroups comprised of protection cycles for node 301. If the edge pairs for each of the protection links are interconnected together as shown in FIG. 3B, one or more cyclegroups will be created. The edges of each of these new cycles belong to the same cyclegroup. Thus, if the edges of protection cycles $C_{1m-}$ 303 . . . $C_{m-1}$ form one cyclegroup CGi shown with label 333, the edges of that cyclegroup will form a protection cycle which allows messages to be transmitted through each of the protection links attached to the node in that particular cyclegroup. From the set of edges in the cyclegroup CGi, two pairs of edges are denoted as end-links of CGi. These pairs of edges can be any of the edge-pairs in cyclegroup CGi. For example, for cyclegroup 1 indicated by label 331, the end-links could be defined as $Pe_1$ 307, 309 and $Pe_{m+1}$ 319. Another example is for cyclegroup i, the end links could be defined as $Pe_2$ 311 and $Pe_m$ 315, 317. Merged cyclegroups are formed when two or more cyclegroups are connected together within a node.

Figure 4:
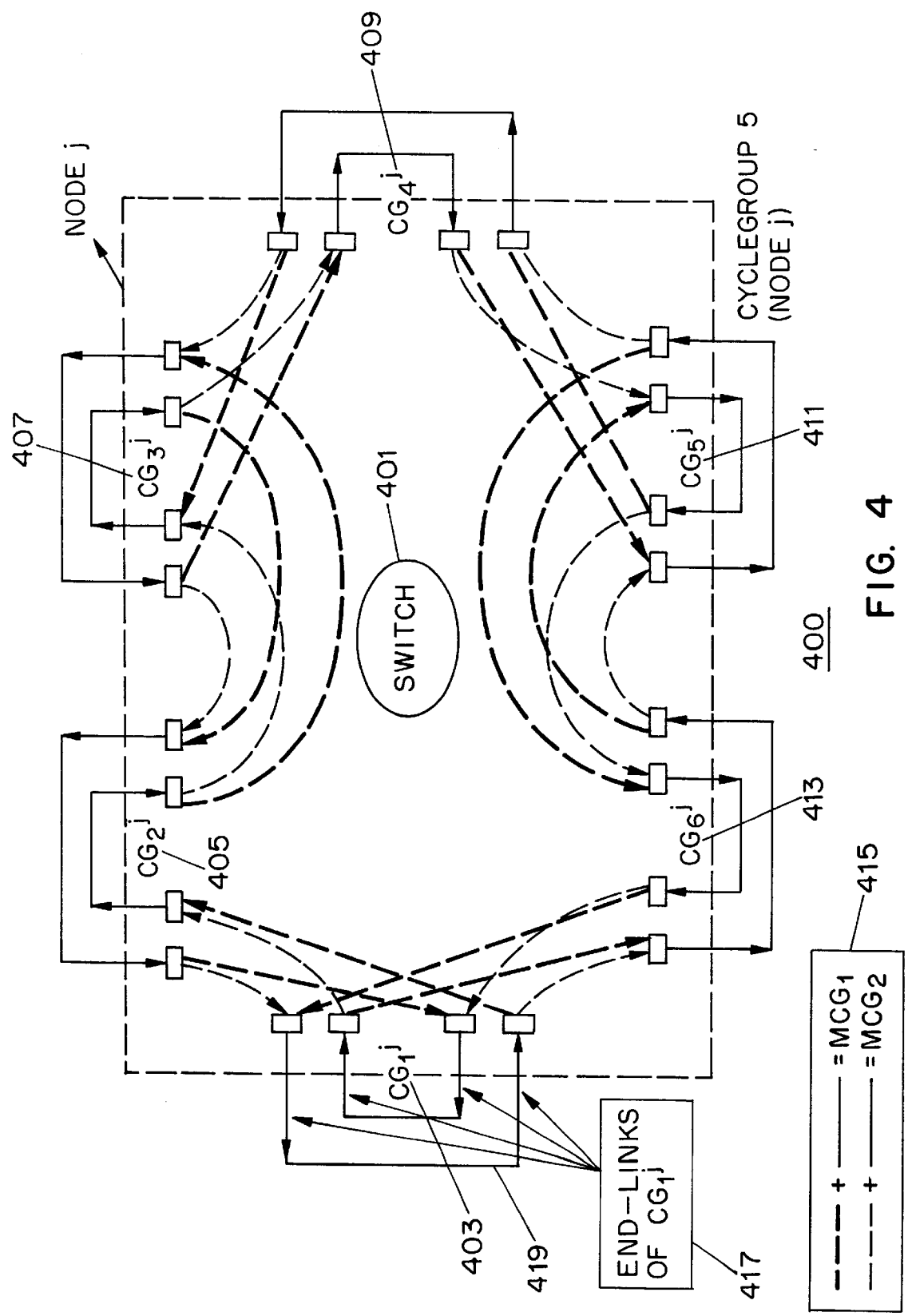
FIG. 4 shows a node with two bi-directional merged cyclegroups.

FIG. 4 shows a node with two bi-directional merged cyclegroups resulting from the interconnection of six individual cyclegroups. FIG. 4 shows a node 400, central switch 401 located inside of node 400 and cyclegroup 1 (CG1) 403, cyclegroup 2 (CG2) 405, cyclegroup 3 (CG3) 407, cyclegroup 4 (CG4) 409, cyclegroup 5 (CG5) 411 and cyclegroup 6 (CG6) 413. The dashed arrows indicate interconnecting protection fibers located within the node. The internal bold dotted interconnecting protection fibers which connect selected cyclegroups together with the external connections comprise merged cyclegroup 1. The internal thin dotted protection fibers which connect selected cyclegroups together with certain of the outside lines indicate merged cyclegroup 2. Legend 415 describes the arrows shown in the figure. Working (normal) interconnections through the switch 401 are not shown in the Figure. Merged cyclegroup 1 can be traced through each cyclegroup via the input/output ports of node 400. The end-links of each cyclegroup are shown such that data can be sent into and out of node 400. The end-links 417 are shown for CG1 403 as an example. If the central switch 401 which normally processes the transmission traffic between input/output ports is not functioning for any reason, the transmissions can be switched onto one of the merged cyclegroups. For example, if a transmission is entering on input port 419 and the transmission is switched onto merged cyclegroup 1, then the transmission will be routed around the defective central switch through the other cyclegroups as shown in the figure until it arrives at its destination. If alternate directional ports need to reached, the transmission can be routed to merged cyclegroup 2 which also sends the transmission around the node ports and cyclegroups to its destination. The transmission could also be switched between cyclegroups at a protection switch in order to change the direction of the transmission (e.g., the transmission being redirected from CG5 to CG6 instead of CG5 to CG4).

Figure 5:
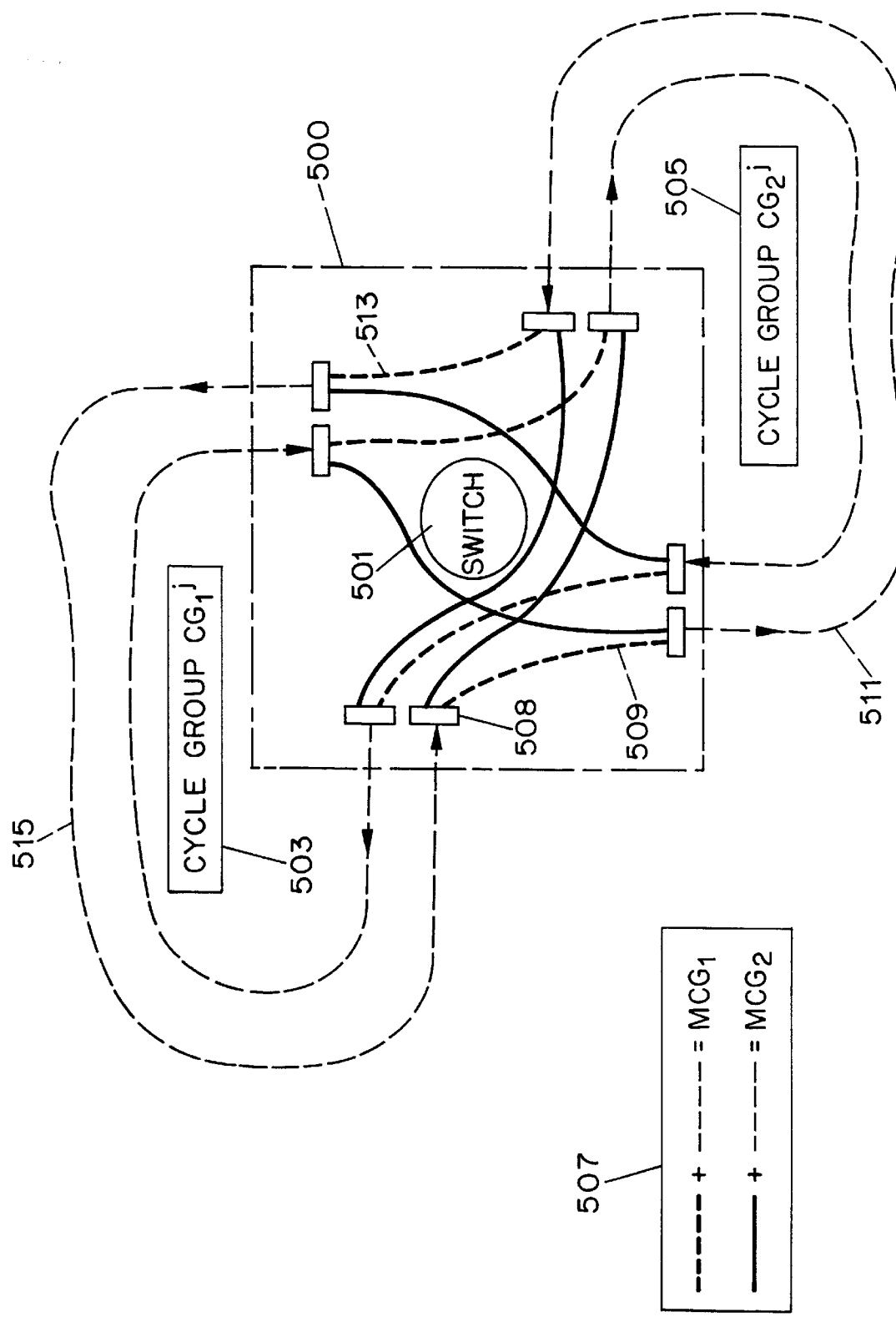
FIG. 5 shows an example of a bidirectional merged cyclegroup resulting from the interconnection of two cyclegroups.

FIG. 5 shows an example of merged cyclegroups resulting from the interconnection of two cyclegroups. FIG. 5 shows node 500, central switch 501 which normally switches messages between the input/output ports of the node, cyclegroup 503 which is connected to the input/output ports of node 500 and cyclegroup 505 which is also connected to some of the input/output ports of node 500. Legend 507 shows that merged cyclegroup 1 is indicated by the dotted bolded protection fibers within the node and the cyclegroup of protection lines external to the node 500. Merged cyclegroup 2 is indicated by the bolded solid protection fibers within the node 500 and the cyclegroup of protection lines external to the node. A transmission traveling around the merged cyclegroup 1 would take the following path when starting at input/output (protection) port 508 until it reached its destination when a failure to switch 501 occurs: protection interconnection fiber 509, cyclegroup 2, protection fiber 511, protection interconnection fiber 513 and finally cyclegroup 1 protection fiber 515.

The protection cycles (elementary cycles that do not return to a node more than once) each belong to a number of cyclegroups (larger cycles) associated with each node. If the start and end links of a failed node-connection belong to the same cyclegroup, restoration is achieved by traversing the cyclegroup until the other side of the failure is reached. If the start and end links of a node-connection belong to different cyclegroups, restoration is achieved by traversing a number of interconnected cyclegroups (the merged cyclegroup), until the cyclegroup with the output node-connection link is reached. The traversal of the different cyclegroups is achieved using the end-link interconnections around the node which contain the failed switch.

Figure 6:
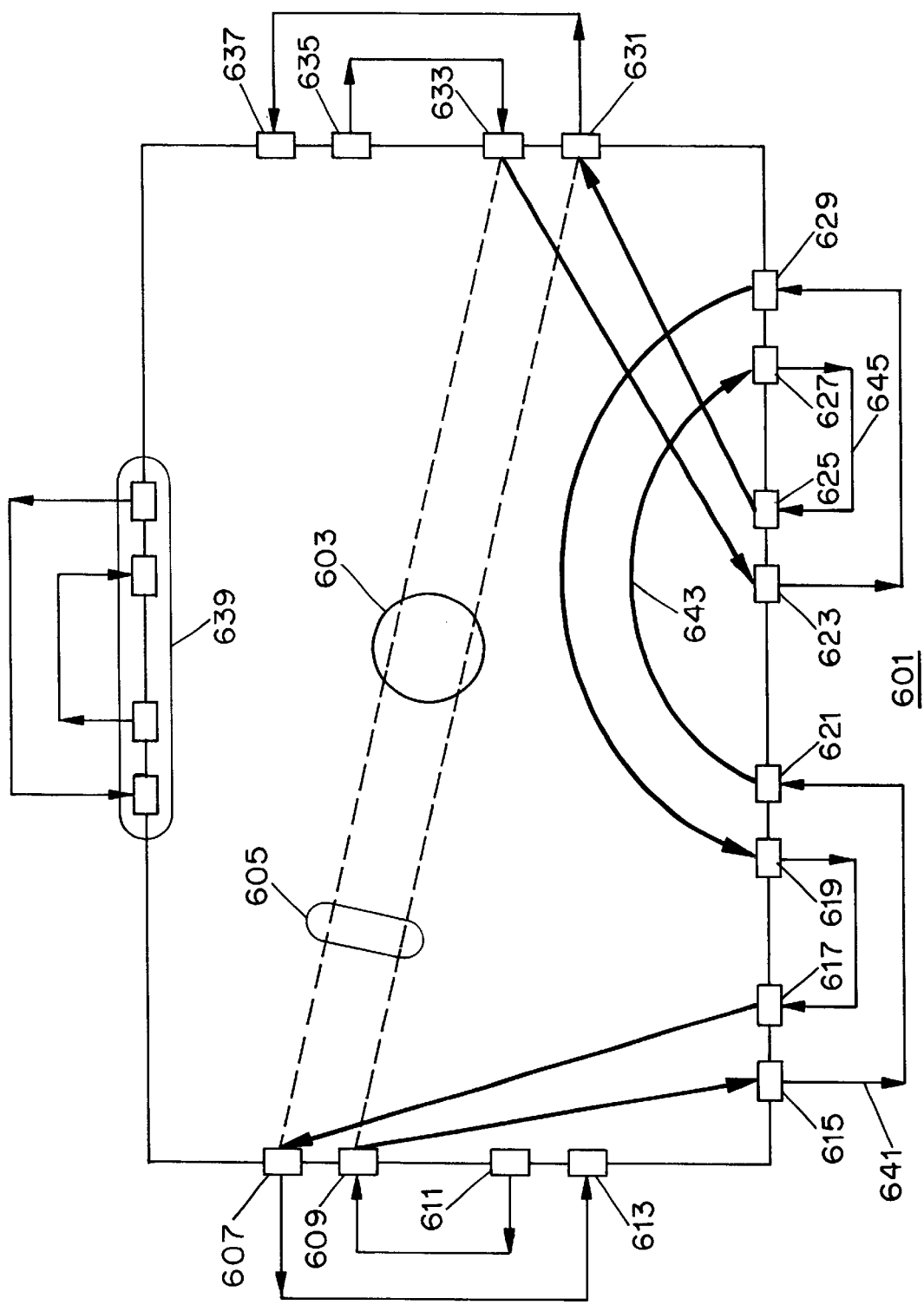
FIG. 6 shows a diagram of a node with a failed switch.

FIG. 6 shows an example of a node 601 with a failed switch. If the central switch 603 had not failed, and a message being input to the node at I/O (protection) port 609 which is required to be sent to I/O (protection) port 631, then the message would have been transmitted through switch 603 which would have directed the transmission to I/O port 631. This transmission trail is indicated by lines 605. A number of cyclegroups connected to node 601 are shown with their corresponding input and output links. If a transmission is sent outside the node along a cyclegroup at I/O port 607, the transmission will be returned at port 613. Correspondingly, if a transmission is transmitted out of port 611, the transmission will be returned at port 609. In the case of a failure of switch 603, the transmission must be redirected onto the merged protection cyclegroups in order to properly transmit the transmissions to the intended recipient. In this example after the protection I/O switches have transferred the signal onto the merged cyclegroups, the transmission will go from port 609 to port 615. It will then be transmitted outside of the node onto cyclegroup 641. It will be received at port 621 and it will then be transmitted along an internal protection fiber 643 to port 627. The transmission will then be sent to cyclegroup 645 to return to port 625. From port 625, it will be sent to port 631, which is the intended receiving port for the transmission. The signal can then be sent to the next node in its transmission path. Thus even though the central switch of the node is not operating, the transmission is successfully routed to the destination link without having to recalculate a path. Cyclegroups could be found for both planar and non-planar, and thus the technique applies to all types of network configurations.

Other protection switches/ports are shown in FIG. 6 (including ports 639, 633, 635, 637, 617, 619, 623 and 629) which could be utilized as part of the merged cyclegroup depending upon the start and destination port and the direction of the message to be transmitted. Fault protection against node failure includes the restoration of one priority (bi-directional) node connection that uses the failed switch.

Figure 7:
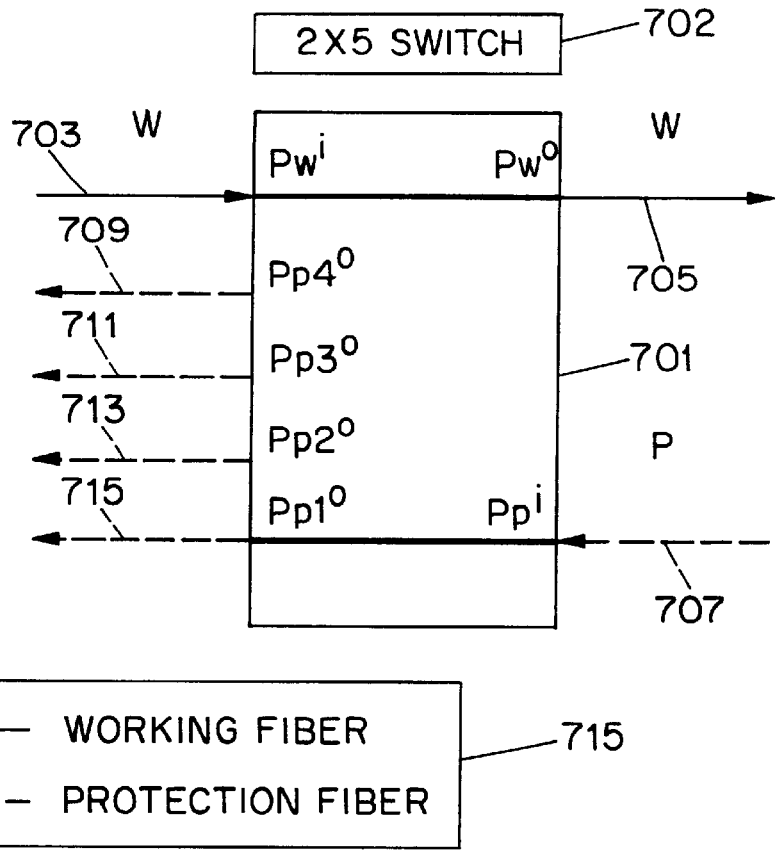
FIG. 7 shows a diagram of a 2×5 protection switch.

FIG. 7 shows a diagram of a 2×5 protection switch 701 which is used to implement the necessary interconnections of different cyclegroups when protecting against total switch failure of a node. Label 702 indicates the switch type. The 2×5 switch 701 includes a working fiber input 703, a working fiber output 705, a protection fiber input 707 and four protection fiber outputs 709, 711, 713 and 715. Legend 715 shows that the working fibers are indicated with solid lines and the protection fibers are indicated with dotted lines.

Figure 8:
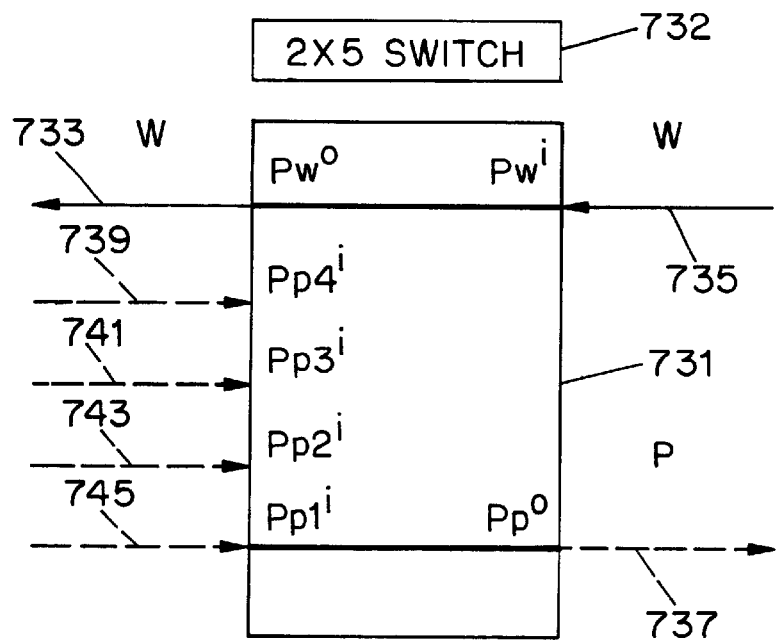
FIG. 8 shows a diagram of a 5×2 protection switch.

FIG. 8 shows a diagram of a 5×2 protection switch which is used to implement the necessary interconnections of different cyclegroups when protecting against total switch failure within a node. Label 732 includes the switch type. The 5×2 switch 731 includes a working fiber output 733, a working fiber input 735, a protection fiber output 737 and four protection fiber inputs 739, 741, 743 and 745.

Port $P_{p1}$ 745 (input/output) of the protection switch in FIG. 8 is the one designated for connection with another $P_{p1}$ port (output/input) of a protection switch for another link in the same switching node. Port $P_{p2}$ 713 (output) of the protection switch in FIG. 7 is the one designated for connection with port $P_{p2}$ (input) of the protection switch for the same link (opposite direction) in the same switching node. Ports $P_{p3}$ 711 and $P_{p4}$ 709 (output) of the protection switch in FIG. 7 are the ones designated for connection with ports $P_{p3}$ and $P_{p4}$ (input) of the protection switch for another link in the same switching node.

During normal operation, working port input $P_{wi}$ 703 is connected to working port output $P_{wo}$ 705 and protection port $P_{p1}$ (output) is connected to port $P_{p1}$ (input). The protection ports $P_{p1}$ 715 and 745 are connected together in a way that creates a family of protection cycles. These are preferably calculated prior to the operation of the network. The protection ports $P_{p1}$ are required in both link and network switch failure recovery. The additional ports ($P_{p2}$, $P_{p3}$ and $P_{p4}$) are only required to protect against network switch failures ($P_{p2}$ is required for switch failures with planar topologies and $P_{p3}$ and $P_{p4}$ are additionally required for switch failures in networks with non-planar topologies).

Figure 9:
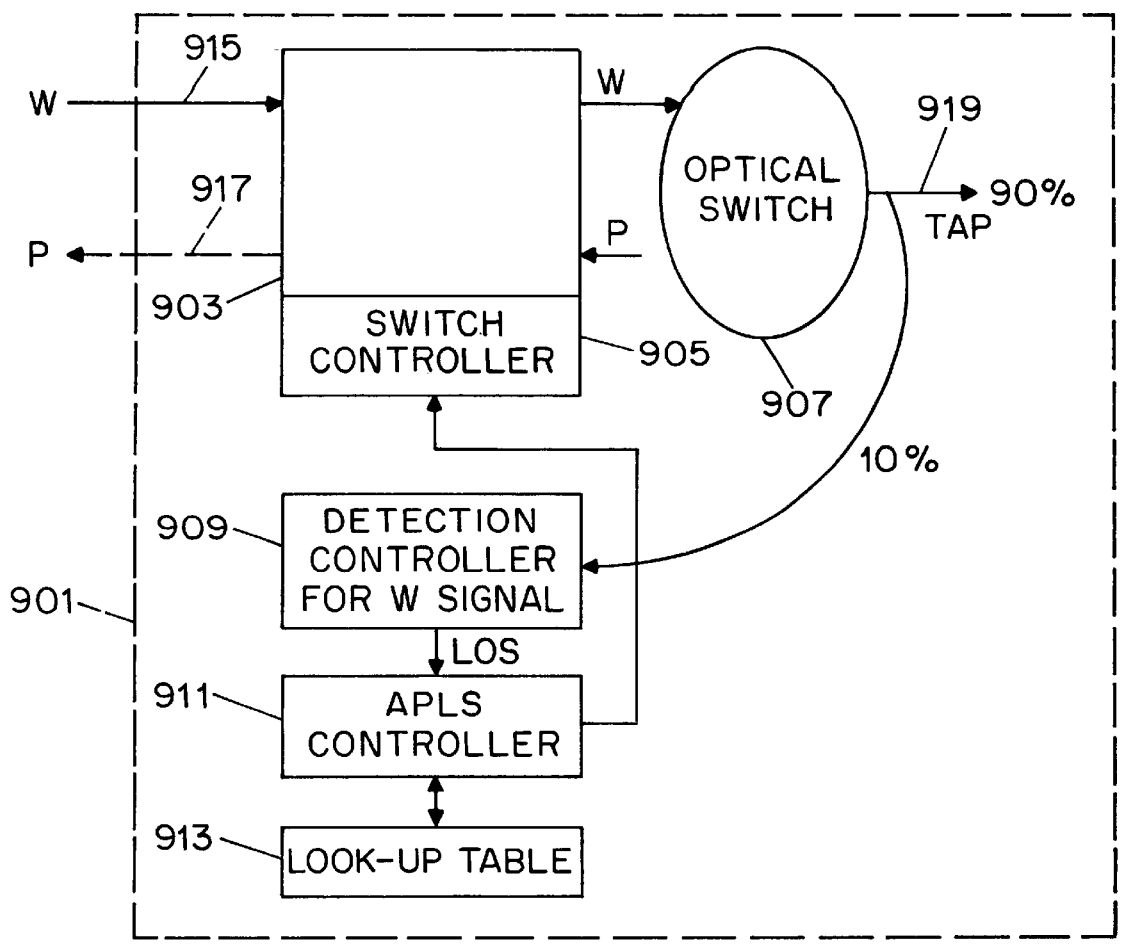
FIG. 9 shows an example of a detection system used in a node.

FIG. 9 shows an example of a detection and restoration system within a node which can be used to automatically detect and correct network switch failures. The system is located within the node which allows for distributed automatic recovery. FIG. 9 shows a node 901 including a protection switch 903, a switch controller 905, an optical switch 907, a detection controller 909, an APLS control 911, a Look-up table 913, a working fiber input 915, a protection fiber output 917 and a working fiber output 919. The node 901 can be for example a 5×2 switch or any other configuration as needed. Detectors (e.g., photo diodes) which are part of or connected to detection controller 909 are coupled to the outputs of each network switch port. If a network switch fails, at least one of the light paths in the preferred embodiment of an optical network passing through the switch will be affected, and one of the detectors will detect a loss of signal condition. Subsequently, the detector controller 909 will notify the local APLS controller of the failure and the local controller will issue the appropriate restoration commands to all protection switches in the affected network node.

The APLS issues commands at the local APLS controller 911 in order to restore signal restoration after a network switch failure. The commands preferably include the following: Clear (C): This command clears the LP, ASP and MSP commands and allows the switch to revert back to its default state; Lockout of Protection (LP): This command prevents switching from any working to protection fiber; Automatic Switch to Protection (ASP): This command automatically switches from working to protection fiber unless an LP command was previously issued. For a protection switch this means switching from port $p^i_w$ to port $p^o_p$ and from port $p^i_p$ to port $p^o_w$; Automatic Switch to Working (ASW): This command automatically switches from protection to working fiber; Manual Switch to Protection (MSP): This command manually switches from working to protection fiber; Manual Switch to Working (MSW): This command manually switches from protection to working fiber. The commands also preferably include the following: (1) ASP2—Automatic Switch to Protection 2: switch protection fiber from default setting (Port $P_{p2}$ input/output connected to port $P_{p2}$ output/input respectively) to port p2; (2) ASP3—Automatic Switch to Protection 3: switch protection fiber from default setting (port $P_{p3}$ input/output connected to port $P_{p3}$ output/input respectively) to port p3; (1) ASP4—Automatic Switch to Protection 4: switch protection fiber from default setting (port $P_{p4}$ input/output connected to port $P_{p4}$ output/input respectively) to port p4. Commands ASP3 and ASP4 are only used for switch failure restoration in networks with non-planar topologies.

In networks with non-planar topologies, as soon as the protection switches are notified of the network switch failure by the detection controller 909, the protection switches (e.g., 903) terminating the priority node-connection receive command ASP and interconnect the working fiber with the selected protection fiber. The rest of the protection switches at the failed node will switch from their default state (port $P_{pi}$ input/output connected to port $P_{pi}$ output/input respectively) to a state where protection port $P_{p1}$ (input/output) is connected to port $P_{p2}$, $P_{p3}$ or $P_{p4}$ (output/input) (via command ASP2, ASP3, or ASP4). Depending upon the location of the priority node-connection links, the local controller uses a lookup table 913 to determine the settings of each protection switch in the affected network node and sends the appropriate commands.

Look-up table 913 has as columns all protection switches associated with the network node and as rows all possible node-connections through that node. The entries in the table are the protection switch settings for each possible node-connection. Thus, after a failure has occurred, the local controller 911 reads the row for the specified priority node-connection, and sends the appropriate commands to the corresponding protection switches.

After all the protection switches switch to their appropriate settings for the signals on the priority node-connection, switching from the working fiber to the protection fiber ensures that the signals will never enter the failed switch. The signals will remain on the protection fiber until they reach the other side of the affected network node and then will switch the signal back to the working fiber. Thus, as in the case of the planar networks, none of the other switches in the network have to be reset as a response to a failure in a switch.

There are two different cases associated with the priority node connection. When both the input and output links of the priority node-connection belong to the same cyclegroup, the rest of the protection switches associated with the cyclegroup in the network node with the failed switch will switch from their default state (port $P_p$ input/output connected to $P_p$ output/input respectively) to a state where protection port $P_p$ (input/output) is connected to port $P_{p2}$ (output/input) (via command ASP2). Because the protection switches associated with links that are not included in the priority node-connection switch from port $P_p$ (input/output) to port $P_{p2}$ (output/input), if the protection cycle carrying the priority node-connection happens to enter the failed network node again, it will bypass that node using port $P_{p2}$. Since the priority links belong to the same cyclegroup, the signal on the priority node-connection will always enter a priority link using the protection fiber of the cyclegroup and then revert back to the working fiber by traversing a portion or all of the cyclegroup to continue its route as if the failure never occurred.

When the input and output links of the priority node-connection belong to different cyclegroups, all of the protection switches in the network node will switch from their default state (port $P_p$ input/output connected to port $P_{p1}$ output/input respectively) to a state where protection port $P_p$ (input/output) is connected to ports $P_{p2}$, $P_{p3}$ or $P_{p4}$ (output/input via commands ASP2, ASP3 and ASP4, respectively). The protection switches associated with the same cyclegroups as the priority links will switch to port $P_{p2}$. If the protection cycle carrying the priority signal happens to enter the failed node again, it will bypass that node using port $P_{p2}$. Similarly, the protection switches associated with the end-links of different cyclegroups will switch to ports $P_{p3}$ or $P_{p4}$ (depending upon the look-up table) to form merged cyclegroups. The signal can then be transferred from one cyclegroup to another until it reaches the cyclegroup associated with the output priority link (called destination cyclegroup). The signal will then traverse the destination cyclegroup and will enter the priority link using the protection fiber and then revert back to the working fiber to continue its route as if the failure never occurred.

To fill in a look-up table, a mapping function is first required to determine how the priority links map to the end-links of their respective cyclegroups. According to the end-links identified, a continuous path needs to found between the corresponding endlinks. This path will provide the settings for the protection switches for each possible node connection in a network node. Each network node will have its own distinct look-up table. If for a particular connection there are multiple choices for protection switch states, one, some or all can be entered in the look-up table.

An Orientable Cycle Double Cover (OCDC) technique can be used to find the protection cycles for the non-planar network. According to the protection cycles obtained, another technique can identify the cyclegroups associated with each network node. Additional techniques can calculate the interconnection configurations between the protection switches in each node (resulting in merged cyclegroups) and obtain the look-up table entries for each network node.

Figure 10:
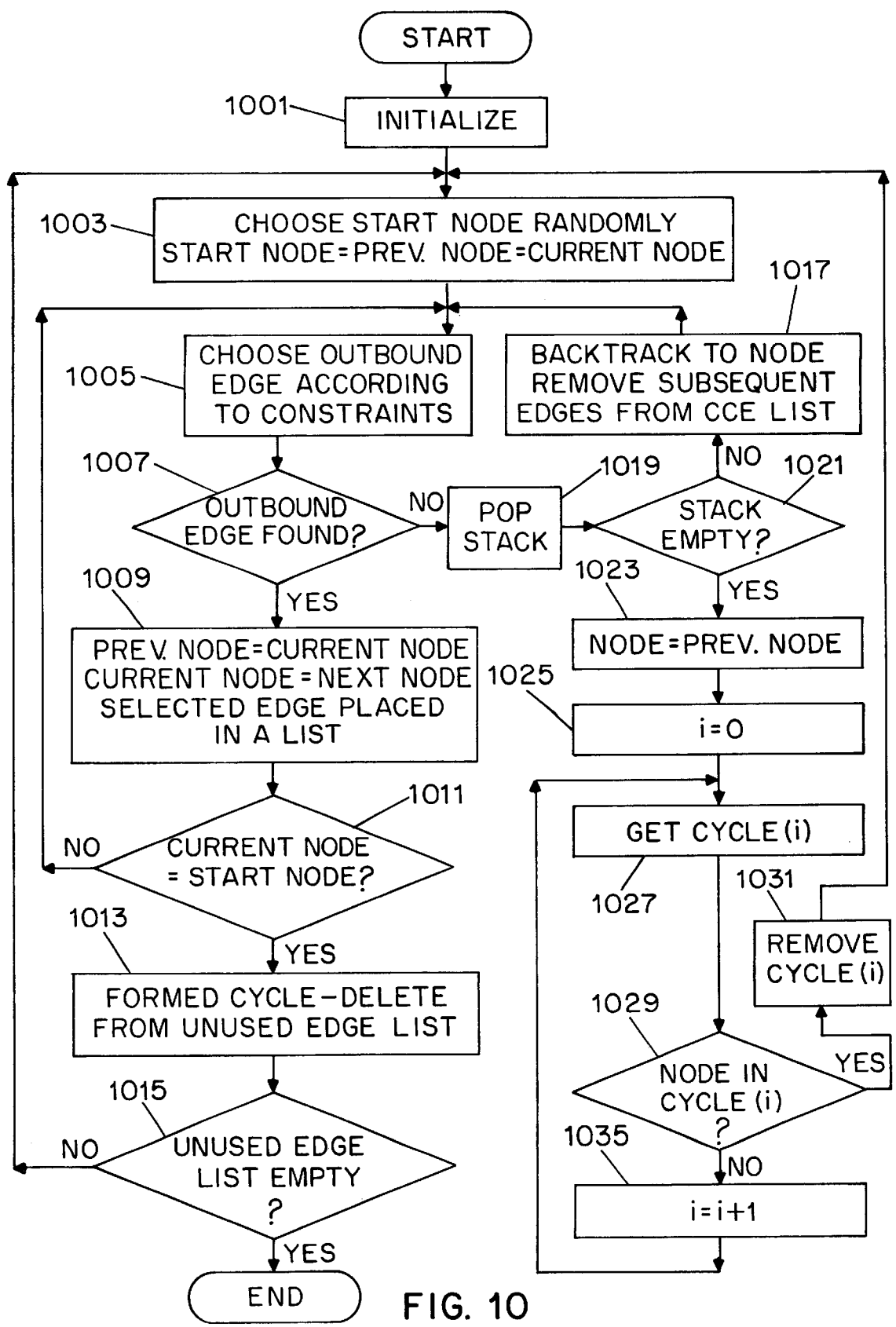
FIG. 10 shows a flowchart of the steps of the Orientable Cycle Double Cover (OCDC) technique.

FIG. 10 shows a flowchart of the steps of the Orientable Cycle Double Cover (OCDC) technique which identifies protection cycles for non-planar graphs. A graph is non-planar if its edges cannot be mapped on a plane so that no two edges intersect (have a common point other than a vertex). The following definitions apply for the application of this technique:

(1) Define an edge set E(N) consisting of all edges in the network (both directions); (2) Define a node set V(N) consisting of all nodes in the network; (3) Define an edge set CCCE(N) consisting of all the Current Cycle Chosen Edges. These are the edges for the cycle currently being constructed; (4) Define an edge set CE(N) consisting of all Chosen Edges. These are the edges that have been chosen for other cycles. These edges cannot be used for any other cycle; (5) Define a set of cycles C. This set will eventually contain the family of cycles comprising the Orientable Cycle Double Cover of the graph; and (6) Define a stack where all the nodes with a choice of multiple outbound edges are placed. These nodes will be taken out of the stack first-in-last-out in case the technique needs to backtrack from a choice it made during the construction of the current cycle.

The following initialization performed in step 1001 of FIG. 10 is preferred for this technique:

(1) CCCE(N)={}. The set of edges for the current cycle is empty; (2) CE(N)={}. The set of chosen edges is originally empty; (3) C={}. The set of cycles is originally empty; (4) E(N)=all edges in the network; (5) V(N)=all nodes in the network; and (6) m=0.

After the initializations have been performed, the technique continues with step 1003.

In step 1003, a node i is chosen randomly from set V(N). Then it is ensured that in set E(N)−CE(N) there are outbound edges incident to i. If not, choose another node i randomly and performs this step over again. Additionally in this step, set the following parameters: Start node=previous node=current node.

In step 1005, at node i an outbound edge (i, j) is chosen from the set of outbound edges incident to node i that belongs to set (E(N)−CE(N)−CCCE(N)) (edges still available but not used in current cycle), so that: (a) The edge (i, j) is not the opposite direction of the edge with which the technique entered node i unless node i is a leaf (a leaf is a signal node that is connected to the rest of the network via a bridge), (b) If after the technique picks edge (i, j) there are only two edges incident to node i, they are not the opposite directions of the same link (i.e., edges (i, l) and (l, i)). This means that if the technique has a choice from several outbound edges it chooses the one such that if only two edges remain incident to node i, they are not a (i, l) (l, i) pair, and (c) Edge (j, i) is not in the chosen set for the current cycle (CCCE(N)) unless edges (i, j), (j, i) constitute a bridge.

If a single outbound edge satisfying criteria (a)–(c) in step 1005 exists as checked in step 1007, go to step 1009. If many such edges with the characteristics described in criteria (a), (b) and (c) of step 1005 exist, place node j in the stack, choose one of the outbound edges that belong in set E(N)−CE(N) randomly and go to step 1009. In step 1009, the following parameters are set: Previous node=current node, current node=next node. Also in step 1009, the selected edge is placed in set CCCE(N).

In step 1011, check if the current node equals the start node (node i has been reached again). If the condition checked for in step 1011 is true, i.e., the start node was reached using an edge not coming from a leaf, go to step 1013. If the condition checked for in step 1011 is false, go to step 1005.

If in step 1005 no such edge is determined to exist, the technique backtracks in step 1015 to the last node at which multiple choices for edges satisfying the constraints existed (the node at the top of the stack). If the stack is empty as checked in step 1021, go to step 1023. If the stack is not empty, pop the node from the top of the stack in step 1019, and remove all subsequent edges in step 1017 previously chosen after the node that is popped from set CCCE(N), and then return to step 1005.

If the stack is empty as checked in step 1021 (the routine has exhausted the backtracking mechanism), the current cycle is "blocked." Now remove all edges from set CCCE (N) by performing steps 1023 through 1033. The last node out of the stack is defined as the "blocking node" and starting with the first cycle in C, the first cycle (cycle $C_i$) where the blocking node appears is found. If the stack was always empty during the creation of the current cycle, the node where no outbound edge is found is defined as the blocking node. Cycle $C_i$ is removed from the family of cycles C as shown in steps 1025, 1027, 1029, 1031 and 1033. Step 1023 sets the parameter node equal to previous node. Step 1025 initializes i to zero. Step 1027 gets cycle (i). Step 1029 determines if the parameter node is in cycle (i). If it is in cycle (i), then remove cycle (i) in step 1031. If it is not in cycle (i), increase i by one in step 1033 and get the next cycle in step 1027. The node must be in one of the previously identified cycles. The remaining cycles in C are renumbered accordingly and the edges in $C_i$ are removed from CE(N). The function m=m−1 is then performed to reduce the cycle count by one. The technique then returns to step 1003.

If the current note equals the start node in step 1011, then the technique continues with step 1013. Step 1013 deletes the formed cycle from the unused edge list by performing the following steps: Cycle m is now $C_m$=CCCE(N); m=m+1; CE(N)=CE(N)+CCCE(N); Empty the stack; and add cycle to set of cycles C.

In step 1015, the unused edge list is checked to determine if it is empty. The test is the following: If CE(N)=E(N) then the technique is finished; otherwise, set CCCE(N) equal to {} and go to step 1003. If the unused list is empty, then the technique is complete and the identified cycles C's are the output.

The constraints (a), (b) and (c) in choosing an outbound edge presented at step 1005 ensure that a choice of an edge will not be made that violates the characteristics of a Cycle Double Cover. The constraints in step 1005 ensure that all edges are used in the cycle decomposition, each edge is used only in one cycle (always chosen from a set of unused edges), and both directions of an edge are not used in one cycle unless that edge is a bridge. Furthermore, additional precautions are taken to ensure that bridges attached to cycles are added to these cycles and cycles that are only comprised of the two directions of a bridge are not allowed.

The backtrack approach of step 1017 enables the technique to reconstruct the current cycle if it reaches a node where any choice of an outbound edge would violate the constraints of step 1003. This is accomplished as follows: during the construction of the current cycle, the technique keeps in a list (stack) of all nodes where more than one outbound edge exists that does not violate the constraints of step 1005. On the top of the list is the latest node where such a condition occurs. If the technique reaches a node where any choice of an outbound edge violates the constraints, it takes out of the list the latest node with multiple choices of "viable" outbound edges. It then chooses another edge that does not violate the constraints and creates a new cycle from that point on.

Figure 11:
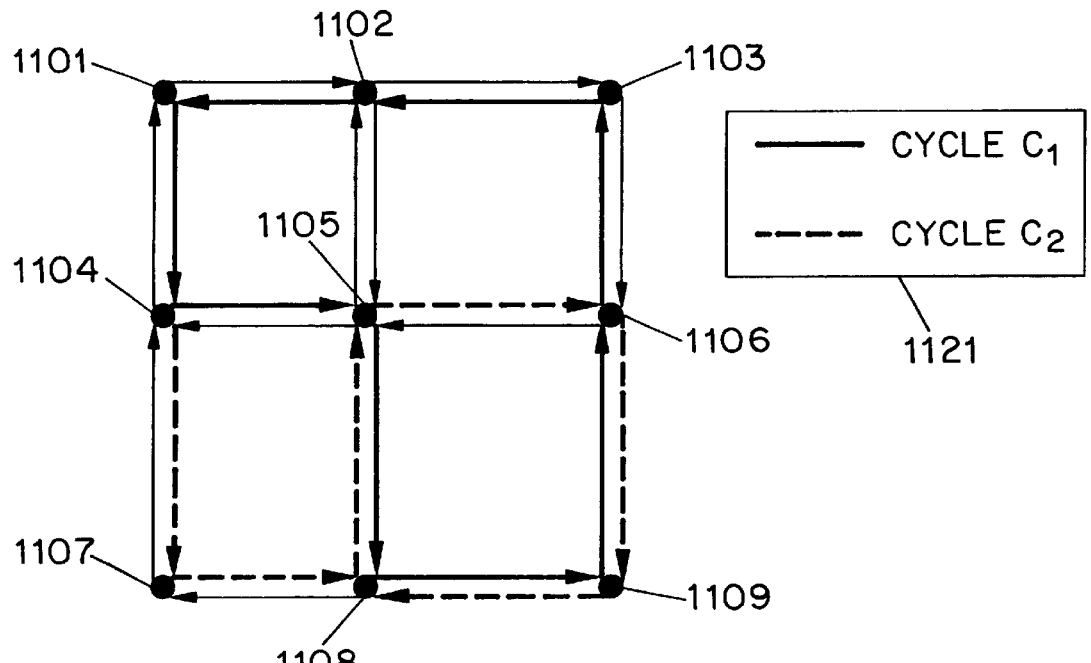
FIG. 11 shows an example of the operation of the OCDC technique applied to a network.

FIG. 11 shows an example of the operation of the OCDC technique. Assume that cycle $C_1$ as indicated by legend 1121 as a bold line has already been created. Current cycle creation $C_2$ starts from node 1104 and CCCE(N)=(1104, 1107), (1107, 1108), (1108, 1105), (1105, 1106), (1106, 1109), (1109, 1108). At node 1108 there is only one choice of an outbound edge (edge (1108, 1107)) which violates the constraint c in step 1005 of FIG. 10. Thus, the technique takes out of the list the last node where multiple choices were available (node 1105). At that node it chooses another edge (i.e., (1105, 1104)) and creates cycle $C_2$=(1104, 1107), (1107, 1108), (1108, 1105), (1105, 1104).

Finally, steps 1023–1033 of FIG. 10 ensure that if cycles have already been created that do not enable us to obtain a cycle double cover of the graph, the technique eliminates these cycles and repeats the procedure finding other cycles that can be a part of the cycle double cover of the graph. To do this, the technique tries to identify the last node where the problem occurs, i.e., the last node where a choice of an outbound edge cannot be found. It then eliminates one of the previous cycles that uses this node and repeats the procedure to obtain new cycles. This is identical to the backtrack approach explained above, but in this case the technique backtracks to previous cycles and not edges. This way, the technique can go through all possible combinations of cycles with the proper characteristics until it finds a family of cycles that constitutes a CDC.

Figure 12A:
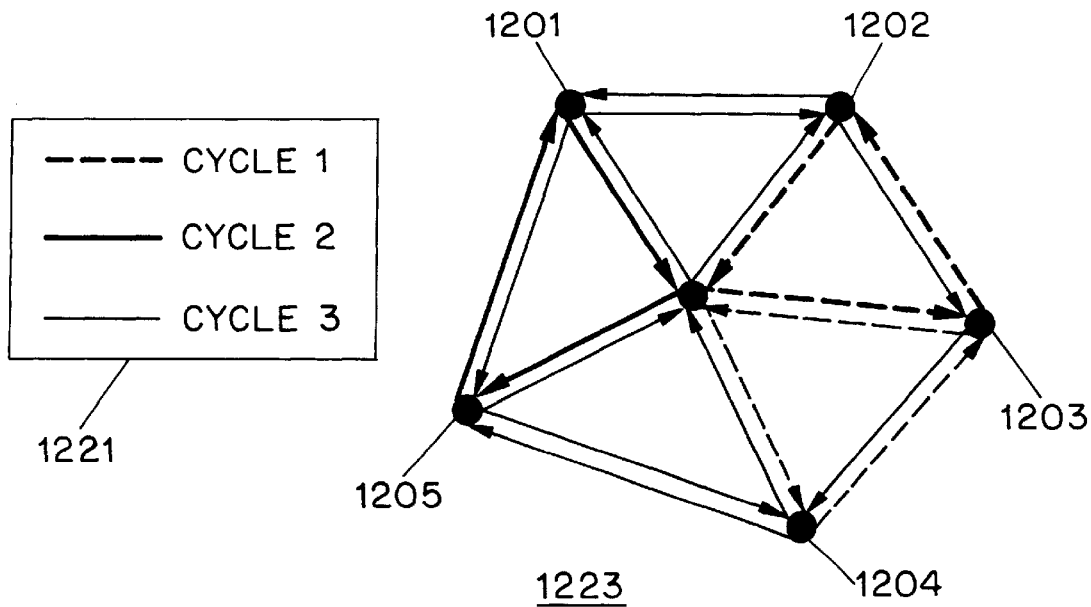
FIG. 12A shows a second example of the operation of the OCDC technique for a network.

FIG. 12A shows an example of the operation of the OCDC technique for a network 1223 with no leaves. Assume that cycles $C_1$, $C_2$ and $C_3$ as indicated by legend 1221 have already been created as shown in the figure. Also assume that for the fourth run it starts randomly from node 1201. It chooses edge (1201, 1202) in order not to violate condition b of step 1005 and then edge (1202, 1203) (only one outbound edge). At node 1203 it chooses edge (1203, 1204) (only one outbound edge) and at node 1204 it chooses edge (1204, 1205) in order not to violate condition b of step 1005 again. The cycle is completed with edges (1205, 1206) and (1206, 1201). Node 1206 is placed in the stack since there is an option between two suitable outbound edges. If the technique had chosen edge (1206, 1202) instead, it would have later discovered at node 1202 that there is no outbound edge satisfying all constraints. The technique would then backtrack to node 1206, remove edge (1206, 1202) from CCCE(N) and choose edge (1206, 1201). After cycle $C_4$ is identified, there is only one cycle $C_5$=[(1201, 1205) (1205, 1204) (1204, 1206) (1206, 1202) (1202, 1201)] left which can easily be obtained. The resulting cycles $C_1, \ldots, C_5$ constitute a Cycle Double Cover (CDC) for the graph in FIG. 12A.

Figure 12B:
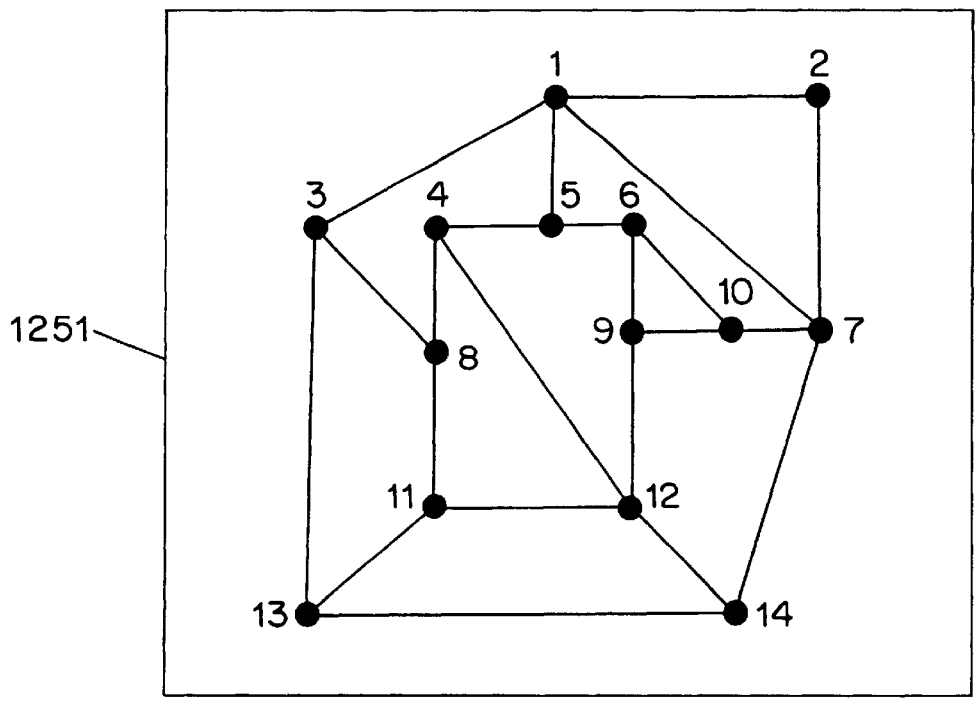
FIG. 12B shows a third example of the operation of the OCDC technique for a network.

FIG. 12B shows a second example to illustrate the need for step 1023–1033 of FIG. 10. Network 1251 is shown with fourteen nodes. Assume that cycles $C_1$=[(4, 12) (12, 9) (9, 6) (6, 10) (10, 7) (7, 2) (2, 1) (1, 3) (3, 13) (13, 14) (14, 12) (12, 11) (11, 8) (8, 4)] and $C_2$=[(10, 9) (9, 12) (12, 14) (14, 7) (7, 1) (1, 5) (5, 4) (4, 8) (8, 3) (3, 1) (1, 2) (2, 7) (7, 10)] have already been chosen. These two cycles obey all constraints of step 1005 in FIG. 10. However, the creation of these two cycles forces edges (7, 10) and (9, 12) to be used in both directions and this isolates edge (5, 6). There is no way to trace edge (5, 6) in two different cycles. Thus, if steps 1023–1037 of FIG. 10 were not included in the technique, the cycle decomposition would eventually fail. Obviously, steps 1023–1033 of FIG. 10 are required to ensure that if a cycle is chosen that would later create problems in the cycle decomposition it can "backtrack," i.e., erase some of the cycles that created the problem and redo the cycle decomposition choosing other cycles.

Figure 13:
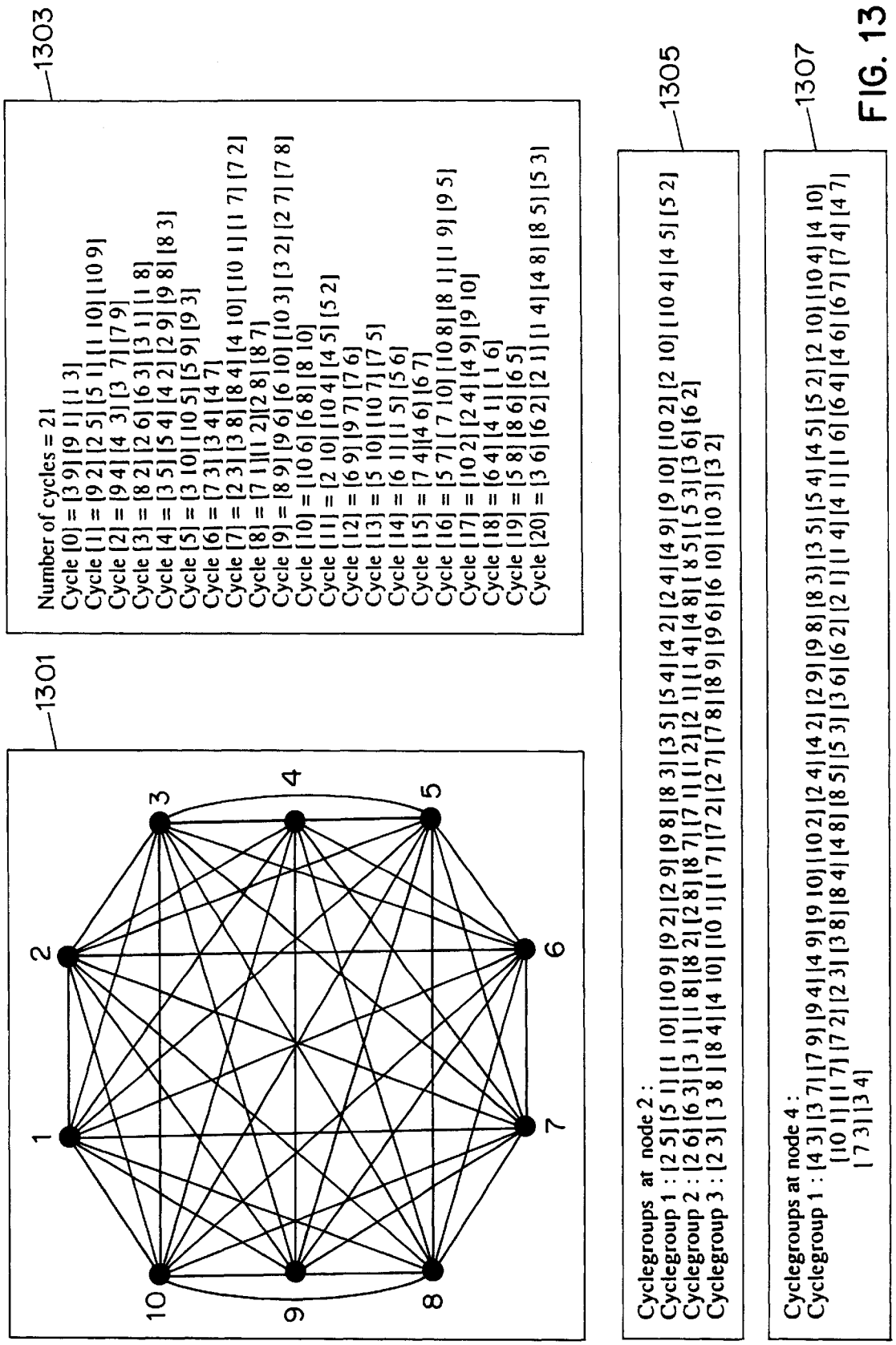
FIG. 13 shows a non-planar network with 10 nodes and protection cycles and cyclegroups for nodes 2 and 4.

FIG. 13 shows an example of a complete (non-planar) network with 10 nodes which is known as a K10 graph 1301. FIG. 13 also shows the twenty-one protection cycles 1303 which are present in graph 1301. The cycles were generated by the OCDC technique described above. Also shown are the cyclegroups which correspond to node 2 (box 1305) and the cyclegroups which correspond to node 4 (box 1307). Cyclegroup 1 for node 2 corresponds to the concatenation of protection cycles 1, 4, 11 and 17 whose path begins and ends at node 2. The remaining protection cycles which include node 2 are reflected in either cyclegroup 2 or cyclegroup 3. Referring to box 1307, Cyclegroup 1 for node 4 includes the following protection cycles 2, 17, 4, 11, 7, 20, 18, 15 and 6. The paths between nodes in the cyclegroups are reflected from the identified protection cycles.

FIG. 14 shows an example of a table 1401 of how the protection switches in network nodes 2 and 4 from FIG. 13 are interconnected. An entry i in the table denotes the protection switch that terminates the link entering/leaving the node from/to neighboring node i. A conventional technique can be used to generate FIG. 14.

In order to generate the interconnections in the table, one technique that can be used utilizes the defined terms as follows: the edges of each of these new cycles belong to the same cyclegroup (CG). Thus, if protection cycles $C_1, \ldots C_k$ form one cyclegroup $CG_i$, the edges of that cyclegroup $E(CG_i) = \cup_{j=1}^{k} E(C_j)$, where $E(C_j)$ represents the edges belonging to protection cycle $C_j$. From the set of edges in cyclegroup $CG_i$, $E(CG_i)$, two pairs of edges are denoted as end-links of $CG_i$, $\{EL(1)^+_i, EL(1)^-_i\}$, and $\{EL(2)^+_i, EL(2)^-_i\}$. These pairs of edges can be any of the edge-pairs in cyclegroup $CG_i$. Again, the plus (+) sign denotes the inbound edge of an end-link and the minus (−) sign denotes the outbound edge of an end-link.

The interconnecting of the opposite directions of the same edges for vertex j, results in cyclegroups $CG^j_0, \ldots, CG^j_1, \ldots, CG^j_{N-1}$. Appropriate interconnections of the end-links of cyclegroup $CG^j_i$ with the end-links of cyclegroups $CG^j_{(i-1) mod N}$ and $CG^j_{(i+1) mod N}$, (where i=0, ..., N−1 and N denotes the total number of cyclegroups associated with vertex j) results in two larger (bi-directional) cycles defined as the merged cyclegroups of vertex j, $MCG^j_1$, and $MCG^j_2$.

A technique for generating the interconnections using the above defined terms is based on the following methodology. Fault restoration of a network switch failure is possible in all k-link, n-node connected (k≧2, n≧1) networks with non-planar topologies and bi-directional links (modeled by k-edge, n-vertex connected (k≧2, n≧1) non-planar graphs with bi-directional edges) if: (1) a family of cycles can be found that covers the network so that all (protection) edges are used exactly once, and in any directed cycle a pair of (protection) edges are not used in both directions, (2) each of the cycles found is elementary and (3) the end-links of cyclegroup i are interconnected with the end-links of cyclegroups (i+1) modN and (i−1)modN ∀ cyclegroups i in a vertex, ∀ vertices in the graph (where i=0), ..., N−1 and N denotes the total number of cyclegroups associated with each vertex) as follows (each pair $\{EL_i, EL_j\}$ indicates that end-link $EL_i$ is connected to end-link $EL_j$):

(3a) $\{EL(1)_i^+, EL(2)^-_{(i-1)modN}\}$, $\{EL(2)_i^-, EL(1)^+_{(i+1)modN}\}$,
$\{EL(2)_i^+, EL(1)^-_{(i+1)modN}\}$, $\{EL(1)_i^-, EL(2)^+_{(i-1)modN}\}$.

(3b) Case I: The number of cyclegroups (N) associated with a vertex is even ($N=N_{even}$):

For i=1,3,5, ..., $N_{even}-1$: $\{EL(1)_i^+, EL(1)^-_{(i+1)modNeven}\}$,
$\{EL(2)_i^-, EL(2)^+_{(i-1))modNeven}\}$, $\{EL(2)_i^+, EL(2)^-_{(i-1)modNeven}\}$,
$\{EL(1)_i^-, EL(1)^+_{(i+1)modNeven}\}$.

(3c) Case II: The number of cyclegroups (N) associated with a vertex is odd ($N=N_{odd}$):

For i=0: $(EL(1)_i^+, EL(2)^-_{(i+1)modNodd})$, $\{EL(2)_i^-; EL(2)^+_{(i-1)modNodd}\}$,
$\{EL(2)_i^+, EL(2)^-_{(i-1)modNodd}\}$, $\{EL(1)_i^-, EL(2)^+_{(i+1)modNodd}\}$.

For i=0: $\{EL(1)_i^+, EL(2)^-_{(i+1)modNodd}\}$, $\{EL(2)_i^-, EL(2)^+_{(i-1)modNodd}\}$,
$\{EL(2)_i^+, EL(2)^-_{(i-1)modNodd}\}$, $(EL(1)_i^-, EL(2)^+_{(i+1)modNodd})$.

For i=1: $\{EL(1)_i^+, EL(1)^-_{(i+1)modNodd}\}$, $\{EL(1)_i^-, EL(1)^+_{(i+1)modNodd}\}$.

For i>1, i=3,5, ..., ($N_{odd}-2$): $\{EL(1)_i^+, EL(1)^-_{(i+1)modNodd}\}$,
$\{EL(2)_i^-, EL(2)^+_{(i-1)modNodd}\}$, $\{EL(2)_i^+, EL(2)^-_{(i-1)modNodd}\}$,
$\{EL(1)_i^-, EL(1)^+_{(i+1)modNodd}\}$.

This approach can also be used for a complete network node failure restoration (i.e., when all equipment in the network node fails). For this example, consider a plane graph with counter-clockwise protection cycles is used. The complete failure of a node with degree $\Delta \geq 2$ occurs. When a complete failure occurs, all edges associated with that node also fail. Assuming that edges {l, m} are on the priority path, after a failure occurs, the protection switches at neighboring nodes will now interconnect the working and protection fibers. The APLS protocol will have the same effect as before, i.e., each protection cycle will be broken at nodes neighboring the failed node and they will be concatenated to create a continuous path from working fiber $W^+_{e1}$, to $W^-_{em}$. The same technique applies for the unidirectional connection from $W^+_{em}$, to $W^-_{e1}$. A signaling mechanism is used in this case, which enables the neighboring network nodes to recognize that a complete network node failure has occurred and take the appropriate action.

FIG. 15 shows an example of a look-up table 1501 for network node 2. The leftmost column 1503 in the table denotes all possible priority transmissions in that node. A value i in the uppermost row 1505 represents the protection switch that terminates the link entering/leaving the node from/to neighboring node i. The entries in the table correspond to the settings for each protection switch. Network node 2 has three cyclegroups associated with it. Thus, priority node-connections with links belonging to the same cyclegroup have only p1 and p2 entries in their respective rows, whereas priority node connections with links belonging to different cyclegroups have p3 and/or p4 entries with their respective rows as well. In the case of node 4, there is only one cyclegroup so there would be only p1 and p2 entries in node 4's lookup table. The look-up table can be generated through a conventional technique.

In networks with non-planar topologies (as well as planar topologies), multiple node-connections through a failed switch can be restored at the same time provided (protection) edge-disjoint continuous paths between the different node-connections can be found. The number of cyclegroups for a graph is associated with each node i's degree Δ (number of connected links). The maximum number of cyclegroups is ⌊Δ/2⌋ and this is the maximum number of simultaneous node-connections that can be restored.

FIG. 16 shows an example of a partially filled network node look-up table 1601 associated with four cyclegroups. Assuming that node-connections (1,3), (7,9), (12,4) and (3,7) are passing through the node before the failure occurred, one goal is to maximize the number of node-connections that can be simultaneously restored in the case of a failure. From FIG. 16, node connections (1,3) and (7,9) (or (1,3) and (12,4)) can be simultaneously restored (the intersection of their corresponding row entries is the empty set). Restoration of node-connection (3,7) however eliminates any possible restoration of other node-connections because there would have to be an overlap of node connections between the different cyclegroups.

The foregoing merely illustrates the principles of the invention. It will thus be appreciated that those skilled in the art will be able to devise numerous systems, apparatus and methods which, although not explicitly shown or described herein, embody the principles of the invention and are thus within the spirit and scope of the invention as defined by its claims.

We claim:

1. A method for restoring a network comprising a plurality of nodes connected by links, wherein each of said nodes comprises a central switch connected to at least one working fiber, comprising the steps of:

providing at least one protection switch for making connections to respective ones of a plurality of protection fibers for at least one of said nodes, wherein said protection switch is capable of switching information from a working fiber to a respective one of said plurality of protection fibers;

providing mapping data indicative of which of said plurality of protection fibers should be switched to by said at least one protection switch in response to a failure of said central switch, wherein said mapping data is calculated responsive to identified cyclegroups for said network; and if a failure of said central switch occurs, causing said at least one protection switch to switch said information from said working fiber to said protection fiber identified by said mapping data.

2. The method of claim 1, wherein said at least one of said nodes is connected to a plurality of said links including an input link and an output link, and said mapping data is organized responsive to the input link and said output link for transmission of said information.

3. The method of claim 2, wherein said mapping data identifies a connection for each of said at least one protection switch based on said input link and output link's identity.

4. The method of claim 1, wherein said mapping data is generated prior to said operation of said network.

5. The method of claim 1, wherein said switching of said information to said identified protection fiber restores operation of said at least one of said nodes.

6. The method of claim 1, wherein said mapping data is stored as a table.

7. The method of claim 1, wherein said cyclegroups comprise at least one protection cycle identified for said network.

8. The method of claim 1, wherein said network is non-planar.

9. The method of claim 1, wherein said network is planar.

10. A system for restoring a network comprising:
a plurality of nodes connected by links, wherein each of said plurality of nodes comprises a central switch connected to at least one working fiber for transferring information between said links;
at least one protection switch for making connections to a plurality of protection fibers for at least one of said plurality of nodes wherein said protection switch is capable of switching information from a working fiber to one of said plurality of protection fibers;
a memory in said at least one node for storing mapping data indicative of which of said plurality of protection fibers should be switched to in response to a failure of said central switch, wherein said mapping data's entry is calculated responsive to identified cyclegroups for said network; and
a fault detector which detects if a fault occurs in said central switch of said at least one node.

11. The system of claim 10, wherein said at least one node is connected to a plurality of said links including an input link and an output link, and said mapping data is organized responsive to the input link and said output link for transmission of said information.

12. The system of claim 11, wherein said mapping data identifies a connection for each one of said at least one protection switch based on said input link's and said output link's identity.

13. The method of claim 10, wherein said mapping data is generated prior to said operation of said network.

14. The system of claim 10, wherein said switching of said information to said protection fiber indicated by said mapping data restores operation of said at least one of said plurality of nodes.

15. The system of claim 10, wherein said mapping data is stored as a table.

16. The system of claim 10, wherein said cyclegroups comprise at least one protection cycle identified for said network.

17. The system of claim 10, wherein said network is non-planar.

18. The system of claim 10, wherein said network is planar.

19. An apparatus for restoring a network, wherein said network comprises a plurality of nodes connected by links and wherein each of said plurality of nodes comprises a central switch connected to at least one working fiber for transferring information between said links, comprising:

at least one protection switch for making connections to a plurality of protection fibers, wherein said at least one protection switch is capable of switching information from a working fiber to one of said plurality of protection fibers in at least one of said plurality of nodes;
a memory coupled to said at least one of said plurality of nodes which stores mapping data indicative of which of said plurality of protection fibers should be switched to in response to a failure of said central switch in a respective one of said at least one of said plurality of nodes, wherein said mapping data's entry is calculated responsive to identified cyclegroups for said network; and
a fault detector which detects if a fault occurs in said central switch of each of said plurality of nodes.

20. The apparatus of claim 19, wherein each of said at least one of said plurality of nodes is connected to a plurality of said links, including an input link and an output link, and said mapping data is organized to be responsive to the input link and said output link for transmission of said information.

21. The apparatus of claim 20, wherein said mapping data identifies a connection for each said protection switch based on said input link and output link's identity.

22. The method of claim 19, wherein said mapping data is generated prior to said operation of said network.

23. The apparatus of claim 19, wherein said switching of said information to said protection fiber indicated by the mapping data restores operation of a respective one of said at least one of said plurality of nodes.

24. The apparatus of claim 19, wherein said mapping data is stored as a table.

25. The apparatus of claim 19, wherein said cyclegroups comprise at least one protection cycle identified for said network.

26. The apparatus of claim 19, wherein said network is non-planar.

27. The apparatus of claim 19, wherein said network is planar.

28. The apparatus of claim 19, wherein said mapping data's entry is responsive to at least one merged cyclegroup comprising a plurality of cyclegroups.

29. The apparatus of claim 19, wherein said protection switch is located at one of said plurality of nodes other than said at least one of said plurality of nodes having the failed central switch.

\* \* \* \* \*